(12) United States Patent
Wang

(10) Patent No.: US 10,140,153 B2
(45) Date of Patent: Nov. 27, 2018

(54) SYSTEM, METHOD, AND MEDIUM FOR FACILITATING AUCTION-BASED RESOURCE SHARING FOR MESSAGE QUEUES IN AN ON-DEMAND SERVICES ENVIRONMENT

(71) Applicant: salesforce.com, inc., San Francisco, CA (US)

(72) Inventor: Xiaodan Wang, Dublin, CA (US)

(73) Assignee: salesforce.com, inc., San Francisco, CA (US)

( * ) Notice: Subject to any disclaimer, the term of this patent is extended or adjusted under 35 U.S.C. 154(b) by 687 days.

(21) Appl. No.: 13/841,489

(22) Filed: Mar. 15, 2013

(65) Prior Publication Data

US 2014/0074641 A1    Mar. 13, 2014

Related U.S. Application Data

(60) Provisional application No. 61/708,283, filed on Oct. 1, 2012, provisional application No. 61/711,837, filed
(Continued)

(51) Int. Cl.
*G06Q 30/06* (2012.01)
*G06Q 30/08* (2012.01)
(Continued)

(52) U.S. Cl.
CPC .............. *G06F 9/50* (2013.01); *G06F 9/5027* (2013.01); *G06Q 30/08* (2013.01); *H04L 43/08* (2013.01);
(Continued)

(58) Field of Classification Search
CPC ................................ G06Q 30/06; G06Q 30/08
(Continued)

(56) References Cited

U.S. PATENT DOCUMENTS 5,432,926 A    7/1995  Citron et al.
5,577,188 A    11/1996 Zhu
(Continued)

FOREIGN PATENT DOCUMENTS

EP    1 510 917    3/2005
EP    1510917      3/2005
(Continued)

OTHER PUBLICATIONS

Lee, Juong-Sik. Recurrent auctions in e-commerce, Rensselaer Polytechnic Institute, ProQuest Dissertations Publishing, 2007. 3299458, 2 pages, downloaded from ProQuestDirect on the Internet on Sep. 21, 2015.*
(Continued)

*Primary Examiner* — Jeffrey A. Smith
*Assistant Examiner* — Jennifer V Lee
(74) *Attorney, Agent, or Firm* — Jaffery, Watson, Mendonsa & Hamilton, LLC

(57) ABSTRACT

In accordance with embodiments for facilitating action-based fair allocation and usage of thread resources, and by way of example, a method includes receiving job requests and bids from organizations over a network, where each job request and the corresponding bid is placed by a user associated with an organization having a resource currency value within a multi-tenant database system, determining resource currency values associated with pending jobs relating to the organizations, wherein the resource currency values corresponds to resources dedicated to the pending jobs, performing an auction of the received bids for resources that are not dedicated and remains available for purchase, where a bid includes a purchase request to purchase the available resources, prioritizing the job requests based on the dedicated resources and the auction of the
(Continued)

available resources, and processing the job requests based on the prioritized job requests.

15 Claims, 9 Drawing Sheets

Related U.S. Application Data on Oct. 10, 2012, provisional application No. 61/709,263, filed on Oct. 3, 2012, provisional application No. 61/700,032, filed on Sep. 12, 2012, provisional application No. 61/700,037, filed on Sep. 12, 2012.

(51) Int. Cl.
  *G06F 9/50*   (2006.01)
  *H04L 12/26*  (2006.01)
  *H04L 12/911* (2013.01)

(52) U.S. Cl.
  CPC ........ *H04L 47/70* (2013.01); *G06F 2209/508* (2013.01)

(58) Field of Classification Search
  USPC ............................. 705/26.1–27.2
  See application file for complete search history.

(56) References Cited

U.S. PATENT DOCUMENTS

| | | |
|---|---|---|
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,909,540 A | 6/1999 | Carter et al. |
| 5,918,159 A | 6/1999 | Fomukong et al. |
| 5,937,205 A | 8/1999 | Mattson |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,263,359 B1 | 7/2001 | Fong et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,260,589 B2 | 8/2007 | Cotner et al. |
| 7,289,976 B2 | 10/2007 | Kihneman et al. |
| 7,340,411 B2 | 3/2008 | Cook |
| 7,363,346 B2 | 4/2008 | Groner et al. |
| 7,620,655 B2 | 11/2009 | Larsson et al. |
| 7,640,339 B1 | 12/2009 | Caronni et al. |
| 7,706,895 B2 | 4/2010 | Callaghan |
| 7,730,478 B2 | 6/2010 | Weissman |
| 8,082,234 B2 | 12/2011 | Brown et al. |
| 8,321,558 B1 | 11/2012 | Sirota et al. |
| 8,458,715 B1 | 6/2013 | Khosla et al. |
| 8,504,691 B1 | 8/2013 | Tobler et al. |
| 8,527,473 B1 | 9/2013 | Brown et al. |
| 8,775,591 B2 | 7/2014 | Bobak et al. |
| 8,949,839 B2 | 2/2015 | Balasubramaniam |
| 9,268,605 B2 | 2/2016 | Wang et al. |
| 2001/0044791 A1 | 11/2001 | Richter et al. |
| 2001/0051890 A1 | 12/2001 | Burgess |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0033191 A1 | 2/2003 | Davies et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |

(56) References Cited

U.S. PATENT DOCUMENTS

| | | |
|---|---|---|
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0183084 A1 | 8/2005 | Cuomo et al. |
| 2005/0223022 A1 | 10/2005 | Weissman et al. |
| 2006/0122927 A1 | 6/2006 | Huberman et al. |
| 2007/0016663 A1 | 1/2007 | Weis |
| 2007/0055554 A1 | 3/2007 | Sussman |
| 2007/0091841 A1 | 4/2007 | Bhushan et al. |
| 2007/0254628 A1 | 11/2007 | Rybak |
| 2007/0256077 A1 | 11/2007 | Zhong |
| 2008/0120129 A1 | 5/2008 | Seubert et al. |
| 2008/0178187 A1 | 7/2008 | Altshuler |
| 2009/0119080 A1 | 5/2009 | Gray |
| 2009/0164635 A1* | 6/2009 | Denker ............... H04L 63/105 709/226 |
| 2009/0177356 A1 | 7/2009 | Plawecki |
| 2009/0177744 A1 | 7/2009 | Marlow et al. |
| 2009/0201935 A1 | 8/2009 | Hass et al. |
| 2009/0265205 A1* | 10/2009 | Stinchcombe ......... G06Q 10/06 705/37 |
| 2009/0287592 A1 | 11/2009 | Brooks et al. |
| 2010/0049570 A1 | 2/2010 | Li et al. |
| 2010/0076805 A1 | 3/2010 | Batsakis et al. |
| 2010/0103938 A1 | 4/2010 | Musoll et al. |
| 2010/0229218 A1 | 9/2010 | Kumbalimutt et al. |
| 2010/0235887 A1 | 9/2010 | Burch et al. |
| 2011/0131645 A1 | 6/2011 | Jonhson et al. |
| 2011/0231457 A1 | 9/2011 | Tager et al. |
| 2011/0296515 A1 | 12/2011 | Krstic et al. |
| 2012/0011518 A1 | 1/2012 | Duan et al. |
| 2012/0192194 A1 | 7/2012 | Richardson |
| 2012/0311153 A1 | 12/2012 | Morgan |
| 2013/0024496 A1 | 1/2013 | Krishnan |
| 2013/0060834 A1 | 3/2013 | Paramasivam et al. |
| 2013/0080559 A1 | 3/2013 | Rao et al. |
| 2013/0111031 A1 | 5/2013 | Hoffmann |
| 2013/0262931 A1 | 10/2013 | Siddalingesh |
| 2014/0068620 A1 | 3/2014 | Factor |
| 2014/0074641 A1 | 3/2014 | Wang |
| 2014/0075017 A1 | 3/2014 | Wang et al. |
| 2014/0075445 A1 | 3/2014 | Wang et al. |
| 2014/0289418 A1 | 9/2014 | Cohen et al. |
| 2015/0066587 A1 | 3/2015 | Glommen et al. |

FOREIGN PATENT DOCUMENTS

| | | |
|---|---|---|
| EP | 2895954 A1 | 7/2015 |
| GB | 2475897 | 6/2011 |
| JP | H0816410 B2 | 2/1996 |
| JP | 2004050550 A | 2/2004 |
| JP | 2010522931 A | 7/2010 |
| WO | 2009040901 A1 | 4/2009 |

OTHER PUBLICATIONS

Shum, K. H. (1997). Replicating parallel simulation on heterogeneous clusters. Journal of Systems Architecture, 44(3-4), 273-292.*
PCT International Preliminary Report on Patentability and Written Opinion of the International Searching Authority, International Application No. PCT/US2013/045509, dated Mar. 17, 2015, 5 pages.
PCT/US2013/045509, Notification of Transmittal of the International Searching Report and the Written Opinion of the International Searching Authority, dated Oct. 9, 2013.
PCT/US2013/045511, Notification of Transmittal of the International Search Report and the Written Opinion of the International Searching Authority dated Oct. 9, 2013, 8 pgs.
PCT/US2013/045509, Notification of Transmittal of the International Search Report and the Written Opinion of the International Searching Authority dated Oct. 9, 2013.
Japanese Office Action for Application No. 2015-531916, dated Jun. 20, 2017, 23 pages.
U.S. Appl. No. 13/841,417 Non-Final Office Action dated Dec. 24, 2015, 13 pages.
Office Action from Chinese Patent Application No. 201380047246.8, dated Aug. 24, 2017, 6 pages.
Canadian Office Action for Application No. 2,883,883, dated Mar. 31, 2017, 3 pages.
Office Action for U.S. Appl. No. 14/526,185, dated Oct. 11, 2017, 23 pages.
Office Action for U.S. Appl. No. 13/841,588, dated Oct. 16, 2017, 13 pages.
Corrected Notice of Allowance for U.S. Appl. No. 13/841,649 dated Feb. 29, 2016, 2 pages.
Examination Report for Canadian Patent Application No. 2,883,883 dated Apr. 26, 2016, 4 pages.
Final Office Action for U.S. Appl. No. 13/841,417 dated Aug. 13, 2015, 10 pages.
Final Office Action for U.S. Appl. No. 13/841,588 dated Oct. 6, 2016. 11 pages.
Final Office Action for U.S. Appl. No. 13/841,649 dated Oct. 21, 2015, 19 pages.
Final Office Action for U.S. Appl. No. 14/634,289 dated Apr. 6, 2017, 18 pages.
First Office Action for Chinese Application No. 201380047246.8 dated Jun. 23, 2017, 13 pages.
International Preliminary Report on Patentability for PCT/US2013/045511 dated Mar. 26, 2015, 6 pages.
Non-Final Office Action for U.S. Appl. No. 13/841,417 dated Mar. 19, 2015, 13 pages.
Non-Final Office Action for U.S. Appl. No. 13/841,588 dated Sep. 23, 2015, 11 pages.
Non-Final Office Action for U.S. Appl. No. 13/841,649 dated May 8, 2015, 15 pages.
Non-Final Office Action for U.S. Appl. No. 13/841,713 dated Apr. 9, 2015, 10 pages.
Non-Final Office Action for U.S. Appl. No. 14/634,289 dated Oct. 18, 2017, 17 pages.
Non-Final Office Action for U.S. Appl. No. 14/634,289 dated Sep. 12, 2016, 16 pages.
Notice of Allowance for U.S. Appl. No. 13/841,417 dated Aug. 5, 2016, 7 pages.
Notice of Allowance for U.S. Appl. No. 13/841,649 dated Jan. 25, 2016, 13 pages.
Notice of Allowance for U.S. Appl. No. 13/841,713 dated Sep. 25, 2015, 25 pages.
Office Action for Japanese Application No. 2015-531916 dated Feb. 27, 2018, 11 pages.
Second Office Action for Chinese Application No. 201380047246.8 dated Jan. 2, 2018, 6 pages.
CA 2,883,883 Examination Report, dated Jun. 9, 2018, 3 pages.
U.S. Appl. No. 14/634,289 Notice of Allowance, dated May 22, 2018, 9 pages.
U.S. Appl. No. 14/526,185 Final Office Action, dated Jul. 13, 2018, 18 pages.
Notice of Allowance for Japanese Application No. 2015-531916 dated Sep. 18, 2018, 5 pages.
Final Office Action for U.S. Appl. No. 13/841,588 dated Jul. 27, 2018, 12 pages.
Notice of Allowance for Japanese Application No. 2015-531916 dated Sep. 18, 2018, 3 pages.
Notice of Grant for Chinese Application No. 201380047246.8 dated Jul. 18, 2018, 4 pages.
Supplemental Notice of Allowability for U.S. Appl. No. 14/634,289 dated Aug. 1, 2018, 2 pages.

* cited by examiner

SYSTEM, METHOD, AND MEDIUM FOR FACILITATING AUCTION-BASED RESOURCE SHARING FOR MESSAGE QUEUES IN AN ON-DEMAND SERVICES ENVIRONMENT

CLAIM OF PRIORITY

This application claims the benefit of U.S. Provisional Patent Application No. 61/708,283, entitled "System and Method for Allocation of Resources in an On-Demand System" by Xiaodan Wang, et al., filed Oct. 1, 2012, U.S. Provisional Patent Application No. 61/711,837, entitled "System and Method for Auction-Based Multi-Tenant Resource Sharing" by Xiaodan Wang, filed Oct. 10, 2012, U.S. Provisional Patent Application No. 61/709,263, entitled "System and Method for Quorum-Based Coordination of Broker Health" by Xiaodan Wang, et al., filed Oct. 3, 2012, U.S. Provisional Patent Application No. 61/700,032, entitled "Adaptive, Tiered, and Multi-Tenant Routing Framework for Workload Scheduling" by Xiaodan Wang, et al., filed Sep. 12, 2012, U.S. Provisional Patent Application No. 61/700,037, entitled "Sliding Window Resource Tracking in Message Queue" by Xiaodan Wang, et al., filed Sep. 12, 2012, the entire contents of which are incorporated herein by reference and priority is claimed thereof, the entire contents of which are incorporated herein by reference and priority is claimed thereof.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to a mechanism for facilitating auction-based resource sharing for message queues in an on-demand services environment.

BACKGROUND

Large-scale cloud platform vendors and service providers receive millions of asynchronous and resource-intensive customer requests each day that make for extremely cumbersome resource allocation and scalability requirements for the service providers. Most customers get frustrated waiting for their request to be fulfilled because none of the conventional techniques provide for any real-time guarantees in responding to such requests. Moreover, multi-tenancy means that multiple users compete for a limited pool of resources, making it even more complex to ensure proper scheduling of resources in a manner that is consistent with customer expectations.

Distributing point of delivery resources, such as application server thread time, equitably among different types of messages has been a challenge, particularly in a multi-tenant on-demand system. A message refers to a unit of work that is performed on an application server. Messages can be grouped into any number of types, such as roughly 300 types, ranging from user facing work such as refreshing a report on the dashboard to internal work, such as deleting unused files. As such, messages exhibit wide variability in the amount of resources they consume including thread time. This can lead to starvation by long running messages, which deprive short messages from receiving their fair share of thread time. When this impacts customer-facing work, such as dashboard, customers are likely to dislike and complain when faced with performance degradation.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

SUMMARY

In accordance with embodiments, there are provided mechanisms and methods for facilitating an auction-based fair allocation and usage of thread resources for user messages according to one embodiment in an on-demand services environment. In one embodiment and by way of example, a method includes receiving job requests and bids from a plurality of organizations over a network, where each job request and the corresponding bid is placed by a user associated with an organization having a resource currency value within a multi-tenant database system via a user interface at a computing device over the network, determining resource currency values associated with pending jobs relating to the plurality of organizations, wherein the resource currency values corresponds to resources dedicated to the pending jobs, and performing an auction of the received bids for resources that are not dedicated and remains available for purchase, where a bid includes a purchase request to purchase the available resources. The method may further include prioritizing the job requests based on the dedicated resources and the auction of the available resources, and processing the job requests based on the prioritized job requests.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Figure 1:
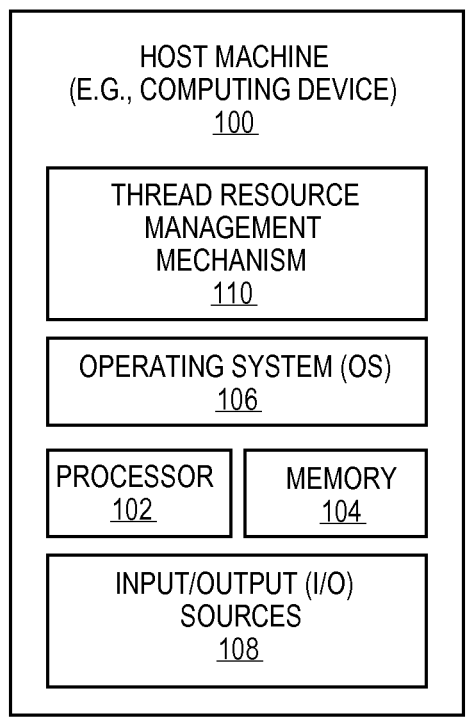
FIG. 1 illustrates a computing device employing a thread resource management mechanism according to one embodiment.

Methods and systems are provided for facilitating an auction-based fair allocation and usage of thread resources for user messages according to one embodiment in an on-demand services environment. In one embodiment and by way of example, a method includes receiving job requests and bids from a plurality of organizations over a network, where each job request and the corresponding bid is placed by a user associated with an organization having a resource currency value within a multi-tenant database system via a user interface at a computing device over the network, determining resource currency values associated with pending jobs relating to the plurality of organizations, wherein the resource currency values corresponds to resources dedicated to the pending jobs, and performing an auction of the received bids for resources that are not dedicated and remains available for purchase, where a bid includes a purchase request to purchase the available resources. The method may further include prioritizing the job requests based on the dedicated resources and the auction of the available resources, and processing the job requests based on the prioritized job requests.

Large-scale cloud platform vendors and service providers receive millions of asynchronous and resource-intensive customer requests each day that make for extremely cumbersome resource allocation and scalability requirements for the service providers. Moreover, multi-tenancy means that multiple users compete for a limited pool of resources, making it even more complex to ensure proper scheduling of resources in a manner that is consistent of customer expectations. Embodiments provide for a novel mechanism having a novel scheduling framework for: 1) differentiating customer requests based on latency of tasks, such that low latency tasks are performed after long running background tasks; and 2) isolating tasks based on their resource requirement and/or customer affiliation so that a task requested by one customer may not occupy the entire system and starve off other tasks requested by other customers. Embodiments further provide for the mechanism to utilize resources efficiently to ensure high throughput even when contention is high, such as any available resources may not remain idle if tasks are waiting to be scheduled.

Embodiments allows for an auction-based approach to achieve fair and efficient allocation of resources in a multi-tenant environment. Currently, most resources in a multi-tenant environment are provisioned using the metering framework in conjunction with statically-defined limits for each organization. For instance, an organization that exceeds their fixed number of application programming interface (API) requests within a short time frame can be throttled. However, manually specifying these limits can be a tedious and error prone process. Such rigid limits can also lead to inefficiencies in which resources are under-utilized. Instead, the technology disclosed herein can build an auction-based economy around the allocation of Point of Deployment (POD) by Salesforce.com. POD may refer to a collection of host machines that store and process data for the provider's customers (e.g., Salesforce.com's customers). For example, each a physical data centers belonging to the provide may have multiple PODs, where each POD can operate independently and consist of a database, a group of worker hosts, a group of queue hosts, etc., and serve requests for customers assigned to that POD. Then, depending on the number of competing requests from organizations, the technology disclosed herein adjusts the price of resources that in turn determine the amount of resources each organization receives.

Embodiments employ and provide an auction-based approach to achieve fair and efficient resource allocation in a multi-tenant environment. Embodiments provide for a richer queuing semantics and enabling efficient resource utilization. Embodiments further provide for performance isolation for customers who exceed their fair share of resources and ensuring that the available resources do not remain idle by dynamically adjusting resource allocations based on changes in customer loads, while facilitating scalability to hundreds of thousands of customers by making decisions in distributed fashion.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed. The technology disclosed herein includes a novel framework for resource provisioning in a message queue that can provide auction-based fair allocation of POD resources among competing organizations. The approach can be applied to any unit of resource such as a database, computer, disk, network bandwidth, etc. It can also be extended to other areas like scheduling map-reduce tasks.

Next, mechanisms and methods for facilitating a mechanism for employing and providing an auction-based approach to achieve fair and efficient resource allocation in a multi-tenant environment in an on-demand services environment will be described with reference to example embodiments.

FIG. 1 illustrates a computing device 100 employing a thread resource management mechanism 110 according to one embodiment. In one embodiment, computing device 100 serves as a host machine employing a thread resource management mechanism ("resource mechanism") 110 for message queues for facilitating dynamic management of application server thread resources facilitating fair and efficient management of thread resources and their corresponding messages, including their tracking, allocation, routing, etc., for providing better management of system resources as well as promoting user-control and customization of various services typically desired or necessitated by a user (e.g., a company, a corporation, an organization, a business, an agency, an institution, etc.). The user refers to a customer of a service provider (e.g., Salesforce.com) that provides and manages resource mechanism 110 at a host machine, such as computing device 100.

Computing device 100 may include server computers (e.g., cloud server computers, etc.), desktop computers, cluster-based computers, set-top boxes (e.g., Internet-based cable television set-top boxes, etc.), and the like. Computing device 100 may also include smaller computers, such as mobile computing devices, such as cellular phones including smartphones (e.g., iPhone® by Apple®, BlackBerry® by Research in Motion®, etc.), handheld computing devices, personal digital assistants (PDAs), etc., tablet computers (e.g., iPad® by Apple®, Galaxy® by Samsung®, etc.), laptop computers (e.g., notebooks, netbooks, Ultrabook™, etc.), e-readers (e.g., Kindle® by Amazon.com®, Nook® by Barnes and Nobles®, etc.), Global Positioning System (GPS)-based navigation systems, etc.

Computing device 100 includes an operating system (OS) 106 serving as an interface between any hardware or physical resources of the computing device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "client", "client device", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "application", "software application", "program", "software program", "package", and "software package" may be used interchangeably throughout this document. Moreover, terms like "job", "request" and "message" may be used interchangeably throughout this document.

Figure 2:
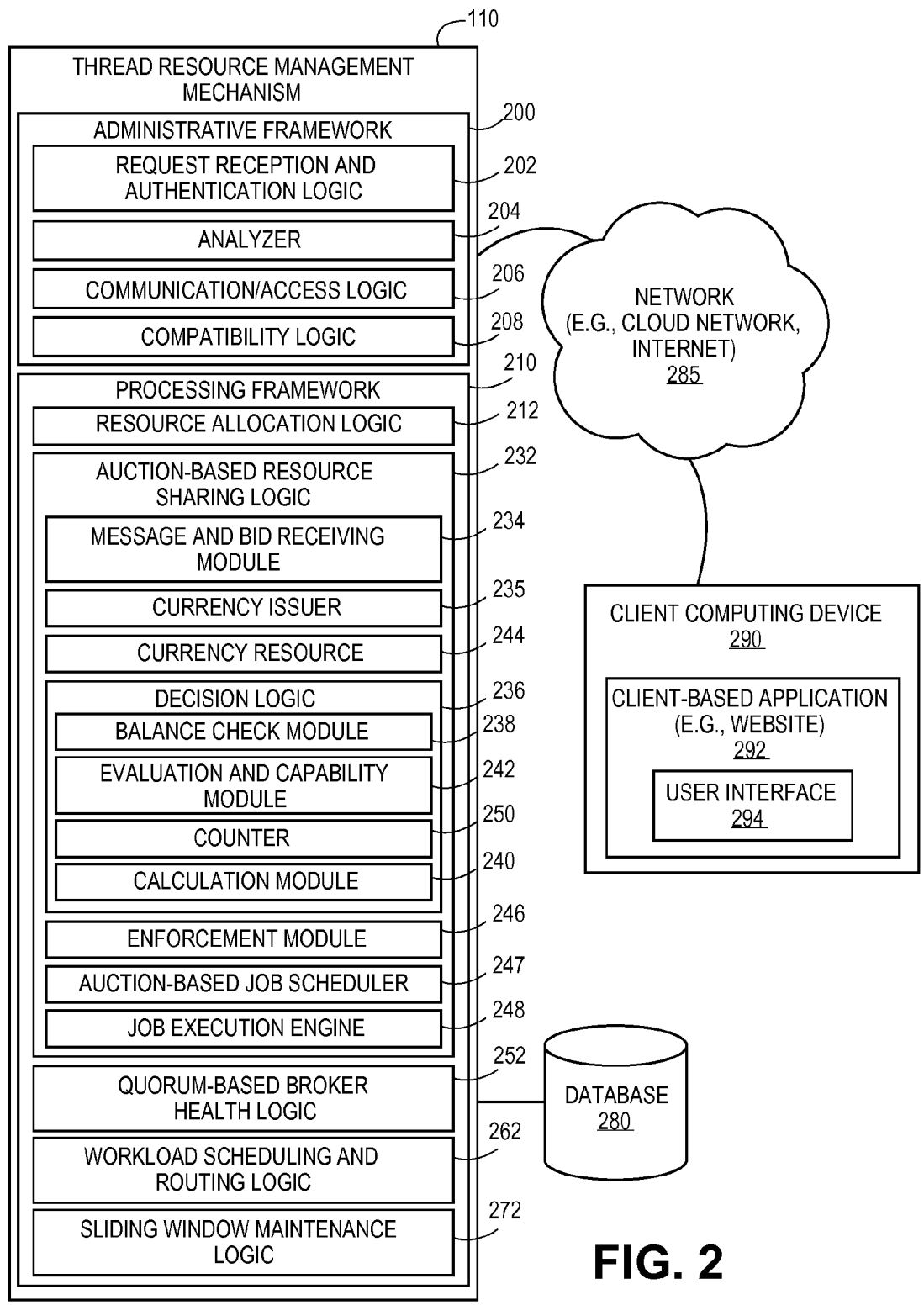
FIG. 2 illustrates a thread resource management mechanism according to one embodiment.

FIG. 2 illustrates a thread resource management mechanism 110 according to one embodiment. In one embodiment, resource mechanism 110 provides an auction-based resource sharing for message queues to facilitate auction-based fair allocation of thread resources among competing message types at a point of delivery.

In the illustrated embodiment, resource mechanism 110 may include various components, such as administrative framework 200 including request reception and authentication logic 202, analyzer 204, communication/access logic 206, and compatibility logic 208. Resource mechanism 110 further includes additional components, such as processing framework 210 having resource allocation logic 212, auction-based resource sharing logic 232, quorum-based broker health logic 252, workload scheduling routing logic 262, and sliding window maintenance logic 272. In one embodiment, auction-based resource sharing logic 232 may include message and bid receiving module 234, currency issuer 235, currency reserve 244, enforcement module 246, auction-based job scheduler 247, job execution engine 248, and decision logic 236 including balance check module 238, calculation module 240, evaluation and capability module 242, and counter 250.

It is contemplated that any number and type of components may be added to and/or removed from resource mechanism 110 to facilitate various embodiments including adding, removing, and/or enhancing certain features. For brevity, clarity, and ease of understanding of resource mechanism 110, many of the standard and/or known components, such as those of a computing device, are not shown or discussed here. It is contemplated that embodiments are not limited to any particular technology, topology, system, architecture, and/or standard and are dynamic enough to adopt and adapt to any future changes.

In some embodiments, resource mechanism 110 may be in communication with database 280 to store data, metadata, tables, reports, etc., relating to messaging queues, etc. Resource mechanism 110 may be further in communication with any number and type of client computing devices, such as client computing device 290 over network 285. Throughout this document, the term "logic" may be interchangeably referred to as "framework" or "component" or "module" and may include, by way of example, software, hardware, and/or any combination of software and hardware, such as firmware. This combination of components provided through resource mechanism 110 facilitates user-based control and manipulation of particular data products/software applications (e.g., social websites, business websites, word processing, spreadsheets, database products, etc.) to be manipulated, shared, communicated, and displayed in any number and type of formats as desired or necessitated by user and communicated through user interface 294 at client computing device 292 and over network 290.

It is contemplated that a user may include an administrative user or an end-user. An administrative user may include an authorized and/or trained user, such as a system administrator, a software developer, a computer programmer, etc. In contrast, an end-user may be any user that can access a client computing device, such as via a software application or an Internet browser. In one embodiment, a user, via user interface 294 at client computing device 290, may manipulate or request data as well as view the data and any related metadata in a particular format (e.g., table, spreadsheet, etc.) as desired or necessitated by the user. Examples of users may include, but are not limited to, customers (e.g., end-user) or employees (e.g., administrative user) relating to organizations, such as organizational customers (e.g., small and large businesses, companies, corporations, academic institutions, government agencies, non-profit organizations, etc.) of a service provider (e.g., Salesforece.com). It is to be noted that terms like "user", "customer", "organization", "tenant", "business", "company", etc., may be used interchangeably throughout this document.

In one embodiment, resource mechanism 110 may be employed at a server computing system, such as computing device 100 of FIG. 1, and may be in communication with one or more client computing devices, such as client computing device 290, over a network, such as network 285 (e.g., a cloud-based network, the Internet, etc.). As aforementioned, a user may include an organization or organizational customer, such as a company, a business, etc., that is a customer to a provider (e.g., Salesforce.com) that provides access to resource mechanism 110 (such as via client computer 290). Similarly, a user may further include an individual or a small business, etc., that is a customer of the organization/organizational customer and accesses resource mechanism 110 via another client computing device. Client computing device 290 may be the same as or similar to computing device 100 of FIG. 1 and include a mobile computing device (e.g., smartphones, tablet computers, etc.) or larger computers (e.g., desktop computers, server computers, etc.).

In one embodiment, resource mechanism 110 facilitates fair and efficient management of message routing and queues for efficient management of system resources, such as application servers, etc., and providing better customer service, where the users may accessing these services via user interface 294 provided through any number and type of software applications (e.g., websites, etc.) employing social and business networking products, such as Chatter® by Salesforce.com, Facebook®, LinkedIn®, etc.

In one embodiment, request reception and authentication logic 202 may be used to receive a request (e.g., print a document, move a document, merge documents, run a report, display data, etc.) placed by a user via client computing device 290 over network 285. Further, request reception and authentication logic 202 may be used to authenticate the received request as well as to authenticate the user (and/or the corresponding customer) and/or computing device 290 before the user is allowed to place the request. It is contemplated that in some embodiments, the authentication process may be a one-time process conducted when computing device 290 is first allowed access to resource mechanism 110 or, in some embodiments, authentication may be a recurring process that is performed each time a request is received by request reception and authentication logic 202 at resource mechanism 110 at the cloud-based server computing device via network 285.

Once the authentication process is concluded, the request is sent to analyzer 204 to analysis and based on the results of the analysis, the request is forwarded on to processing framework 210 for proper processing by one or more components 212, 232, 252, 262, 272 and their sub-components 234-250. Communication/access logic 206 facilitates communication between the server computing device hosting resource mechanism 110 and other computing devices including computing device 290 and other client computing devices (capable of being accessed by any number of users/customers) as well as other server computing devices. Compatibility logic 208 facilitates dynamic compatibility between computing devices (e.g., computing device 290), networks (e.g., network 285), any number and type of software packages (e.g., websites, social networking sites, etc.).

In one embodiment, resource mechanism 110 and its auction-based resource sharing logic 232 allows for an auction-based approach to achieve fair and efficient allocation of resources in a multi-tenant environment. In one embodiment, the technology disclosed herein provides performance isolation by penalizing organizations that exceed their fair share of resources to ensure that resources are distributed fairly and do not remain idle. The allocation may be adjusted dynamically based on the changes in traffic from competing organizations. Moreover, this model scales to hundreds of thousands of concurrent organization by allowing decision making to be distributed across multiple auction servers. The technology disclosed herein provides a suit of algorithms and an auction-based resource-provisioning model for solving the provisioning problem. It includes fair, multi-tenant scheduling to ensure fairness among organizations, efficient resource utilization that adapts to changes in the workload, rich queuing semantics for capturing service level guarantees and a mechanism for distributing and scaling out auction decisions.

Large-scale cloud platform vendors, such as Salesforce.com®, service millions of asynchronous, resource intensive customer requests each day such that starvation and resource utilization are crucial challenges to continued scalability. Customers are willing to wait for these requests, which do not require real-time response time guarantees. These include for example lightweight dashboard tasks and long running Apex bulk load requests that executes as background tasks. Moreover, multi-tenancy is when multiple users compete for a limited pool of resources. Thus, with the novel technology providing by embodiments, extra care is taken to ensure that requests are scheduled and executed in a manner that is consistent with customer expectations. Specifically, auction-based job scheduler ("scheduler") 247 may differentiate customer requests such that low latency tasks are delayed less than long running background tasks, provide performance isolation such that a single customer cannot occupy the entire system and starve other customers. Finally, scheduler 247 can utilize resources efficiently to ensure high throughput even when contention is high; that is, resources may not remain idle if tasks are waiting to be scheduled.

For example, conventional queues, such as Oracle® Advanced Queue ("AQ"), limit the flexibility of the current message queue framework with respect to starvation and resource utilization. Further, because these queues, like AQ, are not multi-tenant aware, all customer messages are stored and processed from a single table in which the application can peek into the first few hundred messages (e.g., 400 in some cases) in the queue. This complicates performance isolation since a handful of customers can flood the first few hundred messages with their requests and starve the remaining customers, resulting in super starvation. Moreover, instrumenting richer queuing semantics is difficult and sometimes infeasible with conventional techniques, such as prioritizing messages types on a per customer basis. One approach to address these limitations in the current framework is to introduce customer-based concurrency limits so to limit the maximum amount of resources that each customer can utilize that can prevent a single customer from exhausting all available resources. The trade-off is idle resource, such as if the workload is highly skewed towards one customer with a lot of activity, there may not be enough requests from other customers in the queue to exhaust all available resources.

In one embodiment, auction-based resource sharing logic 232 of resource mechanism 110 provides a novel technology to facilitate a model for providing richer queuing semantics and enabling efficient resource utilization. Further, the technology disclosed herein employs an auction-based approach to achieve fair and efficient resource allocation in a multi-tenant environment. In particular, the technology disclosed herein provides performance isolation by penalizing customers who exceed their fair share of resources and to ensure that resources do not remain idle by dynamically adjusting allocations based on changes in customer load. The technology disclosed herein scales to any number (such as hundreds of thousands) of concurrent customers by making decisions in a distributed fashion in a multi-tenant environment, and provide certain expectations, such as fair multi-tenant scheduling, customer-based allocation, and market-based throttling, etc.

Fair Multi-Tenant Scheduling

In some embodiments, auction-based resource sharing logic 232 provides a strict notion of fairness for multi-tenant environment. Multi-tenant fairness is not just preventing the starvation of individual customer requests; instead, the technology disclosed herein defines an expected level of resource allocation that is fair and ensure that, during scheduling, resources allocated to customers match our expectations. The technology disclosed herein provides evaluation of fairness by measuring deviations from our pre-defined expectations.

Customer-Based Allocation

Embodiments disclosed herein support fine-grained resource allocation on a per-customer basis. In one embodiment, auction-based resource sharing logic 232 provides a flexible policy in that the technology disclosed herein can take a conservative approach and weigh all customers equally and differentiate customers of important, such as weighing customers by number of subscribers or total revenue to the service provider. For example, at runtime, customers may be allocated resources in proportion to their weight, such that a customer that contributes a certain percentage (e.g., 5%) of total weight may receive, on average, the same fraction of resources as the contribution.

Market-Based Throttling

Embodiments, via auction-based resource sharing logic 232 of resource mechanism 110, fund and manage virtual currencies among customers to ensure fairness; specifically, customers that submit requests infrequently are rewarded while customers that continuously submit long running, batch-oriented tasks are penalized over time.

Efficient Resource Utilization

Embodiments, via auction-based resource sharing logic 232 of resource mechanism 110, facilitate efficient resource utilization on a per-customer basis.

Adaptive Resource Allocation

In one embodiment, auction-based resource sharing logic 232 dynamically adjusts the amount of resources allocated to each customer based on changes in system load, such as competition for resources from pending request and the amount of resources. This is to ensure that allocation remains fair and does not starve individual customers. Moreover, rather than relying on static concurrency limits, the technology disclosed herein dynamically adapts to a system load by increasing allocation to a particular customer so that resources do not remain idle.

Richer Queuing Semantics

Embodiments facilitate a message-based priority on a per customer basis or per-customer service level guarantees and toward this goal. In one embodiment, an organization may place a higher or superior bid, such as with higher monetary value, to purchase an amount of additional resources from available resources. For example, the bids may be broadcast various organizations through their corresponding auction servers to encourage the organizations to place higher or superior bids. The available resources refer to the resources that are not yet dedicated to any of the pending job requests and thus remain available to be taken by the highest bidder. In addition to allocating available resources to the bidder, the size of the job request is also taken into consideration. For example, a large-sized that requires a greater amount of resources may not be accommodated and/or may require a superior bid to be accepted. Similarly, if a pending job request is completed without using all the dedicated resources, the remaining portion of the dedicated resources may be made available to the organization whose job finished early to use those resources for another job request or surrender the resources to be made available for bidding.

Embodiments provide (1) message-based priority; (2) variable pricing of customer requests; (3) hard quality of service guarantees; and (4) research problems that are addressed. Regarding message-based priority, embodiments provide: (1) in one embodiment, auction-based resource sharing logic 232 employs decision logic 236 to perform resource allocation decisions by taking into account both customers and the request type by employing a two-level scheduling scheme. For example, a distributed auction-based protocol may be executed to decide the number of messages from each customer to service. When a customer's requests are dequeued, a fine-grained selection process, as facilitated by various components of 238-244 of decision logic 236, picks which of the customer's requests to evaluate next based on user specified policies. These policies can be local, such as priority by request type on a per-customer basis, or global, such as rate limiting by a specific request type across all customers.

Regarding variable pricing of customer requests, embodiments further provide: (2) using enforcement module 246, customers are allowed to differentiate the value of their messages by indicating that they are willing to pay more to ensure that their requests are processed quickly. Likewise, customers can lower their bid for messages that are not latency-sensitive. On the client-end, customers may accomplish this by simply accessing the system via user interface 294 and dynamically adjust, for example, a pricing factor that determines how much they are willing to pay for resources.

Regarding hard quality of service guarantees, embodiments provide (3) hard quality of service guarantees: since applications have hard, real-time constraints on completion time, auction-based resource sharing logic 232 provides a useful feature that allows for dynamic allocation of a portion of the resources for such applications whereby customers can reserve a minimum level of service, such as lower bound on a number of requests that can be processed over a given period of time.

Regarding various research problems, embodiments provide (4) research problems that are addressed include: robust admission policy having the ability to reject any new reservations that do not meet service level guarantees of existing obligations, ensuring that resources do not remain idle if reservations are not being used, and allowing the customers to reserve a minimum fraction of resources and let the market determine the price they pay.

Distribute and Scale

Resource allocation decisions made by decision logic 236 are designed to be fast (e.g., low overhead) and scalable (e.g., distributed and evaluated in parallel). In one embodiment, currency reserve 244 maintains the balance of how much resource currency each customer has in currency reserve 244. Currency reserve 244 may be accessed by balance check module 38 and calculated, as desired or necessitated, by calculation module 240, for evaluation. Capacity module 242 is used to determine the resource capacity of each customer based on the collected or aggregated resource currency information relating to each customer when the corresponding requests are enqueued. This information may then be partitioned and distributed to the multiple application or auction servers using enforcement module 240.

In one embodiment, multiple server computing systems (e.g., application servers) may be placed in communication with the server computing system hosting resource mechanism 110 or, in another embodiment, multiple application servers may each host all or a portion of resource mechanism 110, such as auction-based resource logic 232, to have the auction-based decision-making ability to serve and be responsible for a set of customers and decide on the amount of resources to allocate to each customer of the set of customers. Thus, in some embodiments, as the number of customers grows, the technology disclosed herein may be (horizontally) scaled across more additional application servers serving as auction servers.

Customer-Specific Utility Metric

The value, to customers, of completing a request often changes as a function of time. For example, an industry analyst would ideally like to receive company earnings reports as soon as possible, and the value of the report diminishes over time if it is delivered late. Hence, accurately capturing utility or customer valuation of requests allows the system to devote more resources to completing tasks that deliver the most value to customers as soon as possible. Customer may choose to specify their utility functions in a variety of ways ranging from a single hard deadline to more sophisticated decay functions, such as linear, exponential, piece-wise, etc. In one embodiment, the user may be granted the ability to assign values to their request for proper and efficient processing; while, in another embodiment, data at currency reserve 244 and other information (e.g., request or customer history, etc.) available to decision logic 236 may be used to automatically assign values to user requests, freeing the users of the burden of assigning a value to each request.

Context-Aware Scheduling

In resource-constrained environments, scheduler 247 can avoid scheduling multiple requests that contend for the same disk, network, database resources, etc. In one embodiment, resource barriers in scheduling are reduced in order to increase parallelism and improve resource utilization. For example, if multiple disk-intensive requests are pending, decision logic 236 may select central processing unit (CPU)-heavy requests first to reduce idle CPU time. One way to accomplish this includes capturing the resource requirements of requests in a graph model, such as similar to mutual exclusion scheduling and pick requests with the fewest conflicts for example barriers in contention for shared resource.

Performance Metrics

In one embodiment, decision logic 236 may use a standardized set of performance metrics to evaluate and compare various queuing algorithms including benchmarks. For example, metrics of value may include fairness, such as customers receives a service that is proportional to their ideal allocation, efficiency (e.g., system throughput and amount of time that resources remain idle), response time (e.g., maximum or average wait time for requests between enqueue and dequeue), etc.

Auction-Based Technique

In one embodiment, auction-based resource logic 232 facilitates an auction-based allocation of message queue threads in a multi-tenant environment, while allowing users to place different bids for the same resource. For example, by default, all customers may be charged the same price per unit of resources consumed, but variable pricing ensures that customers reveal their true valuation for resources and help maintain and conserve resources. For example, resource credits may be regarded as virtual currency (stored at currency reserve 244) that can be used by customers to purchase resources; for example, credits can be viewed in terms of units of resources that can be purchased, such as 1000 credits converted into 1000 seconds of time on a single MQ thread or 100 seconds on 10 MQ threads each, etc.

These currency credits stored at currency reserve 244 may be employed and used by decision logic 236 and enforcement module 246 in several ways, such as credits may be used to enforce customer-based resource provisioning in which if a customer holds a percentage (e.g., 20%) of total outstanding credits and then the customer may, at a minimum, receive that percentage, such as 20%, of total resources. This is regarded as minimum because other customers may choose to not submit any requests, leaving more resources available. Credits can also be used to enforce fairness by rate limiting certain customers. Specifically, a customer that submits requests on a continuous basis and floods the queue is more likely to deplete credits at a faster rate. On the other hand, a customer that enqueues requests infrequently may receive a greater fraction of resources when they do run. Further, these credits are assigned at initialization in which the number of credits are allocated to customer according to, for example, credit funding policies (e.g., options for externally funding credits or how often funds are replenished).

An atomic unit of resource allocation may be regarded as one unit of execution time on a single MQ thread. For example, resources may be machine-timed on worker hosts, where the atomic unit of resource allocation may be one unit of machine time expended on a single worker host. Denominating resources in terms of MQ threads is a good approximation of overall system resource utilization; however, in one embodiment, a more fine-grained provisioning of CPU, database, disk, or network resources, etc. is employed. Messages or jobs are regarded as individual tasks that users associated with customers submit to queues. Associated with each message may be a cost, which may denote the unit of resources required to evaluate a given message and this can be viewed as a proxy for the time (e.g., number of seconds) that the message runs on an MQ thread. Further, various letters may be associated with the customer bid process, such as "O" denoting a customer submitting a bid, "C" denoting the amount of credits, "M" denoting the total cost of all messages from the customer, "N" denoting the total number of distinct messages from the customer, etc. Credits may capture the amount of resources that the customer can reserve, while the total cost of all messages may capture the resources that the customer actually needs. To track total message cost, running counters of pending messages may be updated on a per-customer basis when messages are enqueued and dequeued from the MQ. For example, for each message that is dequeued and executed, the number of credits depleted from the customer may be proportional to the message cost. Since the message cost is a proxy for execution time, any lightweight messages may be charged less than any long running messages, batch-oriented messages, etc.

It is contemplated that any form of pricing may be employed for customers and that embodiments are not limited to or depend on any particular form of pricing. In one embodiment, uniform pricing may be introduced such that pricing may be kept uniform so that each customer pays the same number of credits per unit of resources consumed. In another embodiment, specifying variable pricing may be introduced so that customers can differentiate the importance of their messages and set the value/bid accordingly. These bids can be obtained explicitly (e.g., supplied by customers when messages are enqueued or implicitly) based on the arrival rate of new messages relative to the amount of the customer's remaining credits.

Provisioning Technique

In one embodiment, evaluation and capability module 242 provides an auction-based framework to evaluate customer bids in order to allocate resources in a fair and efficient manner. In one embodiment, a decisions scale may be provisioned across multiple application servers serving as auction servers and explore approaches to provide service level guarantees by message type on a per-customer basis.

Allocation Scenarios

The technology disclosed herein can first illustrate various considerations in multi-tenant resource allocation using examples involving three customers (O1, O2, and O3); for simplicity, the technology disclosed herein can have a single message type in which each message requires exactly one unit of execution time per MQ thread to complete. For example, a cost of one unit of resource per message. The technology disclosed herein can initialize the system with 1000 credits in which the amount the technology disclosed herein can assign to customers O1, O2, and O3 are 700, 200, and 100 respectively and thus, customer O1 can receive 70% of the resources on average.

High Contention

For example, scheduler 247 has 100 units of execution time available across all MQ threads, such as 4 units of execution time each for 25 MQ threads. Moreover, the initial state of the queue is high contention in which all customers have enough messages to exhaust their resource allocation and the corresponding bids may be as follows: <O1, 700, 300, 300>, <O2, 200, 42, 42>, and <O3, 100, 12, 12>. The number of messages and the total cost of messages is the same for each customer and because there may be a cost of one unit of resource per message.

In this example and in one embodiment, allocation fairness may be based on the amount of credits. A customer with more credits may indicate that a customer is a large organization which enqueue messages at a higher rate or that the customer rarely submits messages and can receive a high allocation when they do submit. In one embodiment, decision logic 236 may use credits at currency reserve 244 as a proxy for fairness; namely, a large customer may receive a higher allocation of resources initially and as their credits deplete, their allocation may reduce gradually such that on average, the amount of resources that the customer receives may be proportional to the number of credits that they were initially assigned. Continuing with the above example, based on the number of credits assigned initially, the evaluation and capability module may facilitate enforcement module 246 to allocate 70 units of execution time to O1, 20 to O2, and 10 to O3. Thus, 70, 20, and 10 messages from customers O1, O2, and O3 are processed and a commensurate number of credits are deducted from each customer.

Medium Contention

Once an additional 100 units of execution time is made available, each customer submit the following revised bids based on the remaining number of messages and credits: <O1, 630, 230, 230>, <O2, 180, 22, 22>, and <O3, 90, 2, 2>. In this case, contention is medium because customer O3 does not have enough messages to exhaust its allocation of 10 units of execution time. Thus, to prevent an over-allocation of resources to O3 that will result in idle MQ threads, 2 units are allocated. The remaining 98 units of execution time may be assigned to O1 and O2 in proportion to the number of credits they have remaining, which translates into roughly 76 and 22 units for O1 and O2 respectively.

Low Contention

At the next round of allocation, customer O1 submits a bid because messages from customers O2 and O3 are exhausted: <O1, 554, 154, 154>. Since there is no contention from other customers, O1 receives the entire share of the allocation such that none of the MQ threads remain idle. The above three scenarios illustrate that when contention is high, resources may be distributed proportionally based on the number of credits assigned to customers. When contention is low, resources are allocated fully and proportionally among the active customers to ensure that MQ threads do not remain idle.

Bid Evaluation

In one embodiment, evaluation and capability module 242 evaluates bids from various customers in order to implement the aforementioned scheduling strategies, such as allocate R units of a given resources (e.g., a pool of threads or database connections) and let an auction server A be responsible for allocating these resources to customer O1 and similarly, the customer may submit a vector comprising bids using the format described earlier, where $C_{sum}$ may be defined as the total remaining credits from all customers or $C_1+\ldots+C_n$. Further, the auction server may first iterate through each customer and compute their bid b(i) which describes the actual number of resources a customer Oi would like to purchase. By default, this is the total cost of all messages from the customer that are enqueued; however, the customer may not have enough credits to obtain the resources needed to satisfy all of its messages, the bid for customer Oi may be defined as: $b(i)=\min\{M(Oi), C_i*R/C_{sum}\}$.

M(O1) captures the total cost of messages from Oi, while $C_i*R/C_{sum}$ describes the expected amount of the current allocation R that Oi can reserve based on its remaining credits. The auction server then sums bids from all customers denoted as b(sum) and finally, the actual amount of resources that is allocated to a customer Oi is computed as: $r(i)=\min\{M(Oi), b(i)*R/b(sum)\}$, where M(Oi) prevents the allocation of more resources than a customer needs. The bid evaluation algorithm enforced by auction-based resource logic 232 is fair in that each customer consumes, on average, a fraction of total resources available that is proportional to the amount of credits that they were assigned. Further, auction-based resource logic 232 utilizes resources efficiently as it dynamically adjusts the fraction of resources assigned based on system load; for example, b(i) as a function of the actual cost of messages from Oi.

Optimality

Embodiments provide for optimality for fractional messages, where it can preempt the execution of a message from Oi if it has exceeded the resources allocated to Oi. For fractional message processing, optimality may be shown by mapping to the fractional knapsack problem. Optimality here means that the amount of resources allocated match expectations. For example, if $C_i$ credits were allocated to customer Oi, then the technology disclosed herein can expect $C_i*R/C_{sum}$ units of resources to be allocated to Oi. However, if the total number of messages (M(Oi)) submitted by Oi is less than that amount, the evaluation and capability module 242 may allocate no more than M(Oi) units of resources and that for fractional messages, the $r(i)=\min\{M(Oi), C_i*R/C_{sum}\}$ resources are allocated to Oi.

Distributed Bid Evaluation

As aforementioned, multiple application servers may be employed to serve as auction servers and in that case, multiple auction servers may evaluate their bids in parallel such that the auction can scale to hundreds of thousands of customers. To enable the distributed bid evaluation, an additional network round-trip may be used to distribute bid information among the multiple auction servers. Specifically and in one embodiment, individual auction servers are assigned a set of customers on which to compute their local bids, where the local bids are then distributed among the multiple auction servers so that each server can arrive at a globally optimal allocation decision.

Initially, for example, k auction servers $A_1$ and $A_k$ may be employed in which each auction server is responsible for allocating a subset of total available resources R to a subset of customers. Server $A_i$ may be responsible for allocating $R_i$ to its customers, where $R=R_1+\ldots+R_k$, and customers can be partitioned equally among the auction servers (e.g., load skew is not a major concern since bid vectors are fix sized). To arrive at the globally optimal allocation, each auction server first collects bids from the subset of customers that it was assigned. Auction servers then compute individual bids b(i) for each customer as described earlier (using global values for R and $C_{sum}$. Next, each server sums bids from its local subset of customers in which $b_i(sum)$ denotes the sum of customer bids from auction server $A_i$. The local sums are broadcast to all auction servers participating in the decision. Once collected, each auction server computes the fraction of resources that it is responsible for allocating to its customers: $R_i=b_i(sum)*R/(b_1(sum)+\ldots+b_k(sum))$.

Furthermore, each auction server $A_i$ runs the bid evaluation algorithm described earlier for its subset of customers using $R_i$ and the locally computed $C_{sum}$. For example, the cost of any additional network round-trip to distribute intermediate bid values among auction servers may be eliminated entirely by using global, aggregate statistics about queue size and total remaining credits to achieve a reasonably good approximation of $R_1, \ldots, R_k$.

Variable Pricing

In some instances, a customer may be willing to expend more credits to ensure that their messages are processed quickly. For instance, a customer may submit messages infrequently and, as a result, accumulate a large amount of remaining credits. A customer may briefly want to boost the amount of resources allocated to a group of latency-sensitive messages. In one embodiment, customers may be allowed to differentiate their valuation of resources by specifying a pricing rate p. The rate p allows customers to, for instance, decrease the rate in which credits are consumed when their messages are not latency-sensitive or boost the amount of resources allocated when they can afford to expend credits at a faster rate.

When the value of p is 0<p<1, then the customer pays less than the standard rate of one credit per unit of resource consumed. For p>1, the customer is willing to over-value resources and pay several factors above the standard rate. For example, let p(i) be the rate of customer Oi, then p(i) influences the customer's bid as follows: $b(i)=\min\{M(Oi), C_i*R*p(i)/C_{sum}, C_i/p(i)\}$, $C_i*R*p(i)/C_{sum}$ allows the customer to reduce or boost the fraction of resources received relative to their remaining credits, such as if p(i)>1 then the customer is willing to over pay per unit of resources to process their messages. Finally, $C_i/p(i)$ bounds the maximum amount of resources that Oi can reserve based on p(i) and remaining credits. This establishes a check by balance checking module 238 to prevent a customer with few credits from reserving more resources than it can afford. Further, system contention or competition from other customers may dictate how many resources a customer actually receives during the bidding process and this can be illustrated for both the high and low contention scenarios from our earlier example.

High Contention

Consider the following high contention scenario from the earlier example. For example, a pricing factor, p(i), is attached for each customer at the end of the bidding vector in which customer O2 is willing to pay three times the standard rate for resources: <O1, 700, 300, 300, 1>, <O2, 200, 42, 42, 3>, and <O3, 100, 12, 12, 1>. These bids translates into the following b(i)'s respectively for each customer: 70, 42, and 10 (e.g., note that customer O2's bid increased from 20 to 42). In turn, resources are allocated to customers in the following proportions: 57 (O1), 35 (O2), and 8 (O3). Customer O2 can complete a vast majority of its messages in a single round, but depletes credits at a much faster rate than other customers. After the first round, the number of remaining credits and messages from each customer are shown as follows: customer O1 with 243 messages and 643 (700−57) remaining credits, O2 with 7 messages and 126 (200−35*2.1) remaining credits, and O3 with 4 messages and 92 (100−8) remaining credits.

Further note that the actual pricing factor charged against customer O2 is 2.1 as opposed to 3 and this is because if O2 was to increase its bid by a factor of 3, then its actual bid would be 60. However, evaluation and capability module 242 of auction-based resource logic 232 uses a minimum of M(Oi) and $C_i*R*p(i)/C_{sum}$ to prevent the allocation of more resources to O2 than it actually needs and thus O2 is assigned fewer resources than its maximum bid allows. Further, in one embodiment, evaluation and capability module 242 has the ability to retroactively adjust the pricing downward to reflect the actual pricing rate of p(i) that O2 had to submit to obtain 35 units of resources (e.g., what it actually consumed): revised $p(i)=b(i)*C_{sum}/(C_i*R)$. Solving for the above equation (42*1000)/(200*100)) yields a pricing rate of 2.1, which means that O2 is needed to bid 2.1 times the standard price to obtain 35 units of resources that it actually consumed.

Low Contention

Now, consider low contention from the earlier example in which O1's messages remain in the queue. If the customer's messages are not latency-sensitive, they may reduce their pricing factor to conserve their credits for later. Although they may receive a smaller fraction of resources when contention is high, but when contention is low, they may deplete their credits at a much slower rate to reserve the same amount of resources. Consider the following bid from O1: <O1, 554, 154, 154, 0.5>. This bid indicates that O1 is willing to pay one credit for every two units of resources received; however, since O1 is the customer that is bidding, it receives the full share of allocation. In the end, O1 is expected to have 54 messages remaining in the queue along with 504 credits (554−100*0.5).

Service Guarantees

Some customers, for example, with latency-sensitive applications may wish to reserve a fraction of the resources to ensure a minimum level of service. This can be accomplished by, for example, allowing a customer to specify a fixed fraction in which the pricing factor p(i) they wish to pay may be determined by the market during the bidding process. The bidding process may be performed, by auction-based resource sharing logic 232, where customers that do not require service level guarantees may submit bids, where such bids are then used to compute the bid amount for the customer wishing to reserve a specific fraction of available resources. Once the second bidding phase completed, a global resource allocation decision is made by decision logic 236. For example, in addition to p(i), attached to each customer's bidding vector is their desired reservation of resources f(i) in which f(i) captures the fraction of resources that the customer wants to obtain.

Note that customers specify either p(i) or f(i), but may not specify both and that is because pricing and reservations are duals of each other, such as fixing the price determines how much resources a customer can reserve, while fixing the reservation determines how much the customer pays: <O1, 700, 300, 300, 1>, <O2, 200, 42, 42, 35%>, and <O3, 100, 12, 12, 1>. Further note that customers O1 and O3 fix their pricing p(i) at 1, while O2 fixes the desired reservation at 35% of available resources. To prevent idle resources, decision logic 236 decides to reserve no more than the number of messages from O2 pending in the queue, such as if O2 had 10 messages in the queue, then 10% of the resources may be reserved and such may be recorded, via a corresponding entry, in currency reserve 244.

In the first bidding phase, an auction server tallies the total amount of reservations from all its corresponding customers. In this case, O2 reserves 35% (or 35 units) of resources, denoted as $R_f$, where the resources left for the remaining customers may be denoted as $R_p(R−R_f)$. Thus, in one embodiment, customers may be partitioned into two classes: 1) those who are content with a best-effort allocation of $R_p$ resources; and 2) those that want to reserve a specific amount of resources $R_f$. In one embodiment, calculation module 240 of decision logic 236 may compute the bids for each of the best-effort customers, which sums to $b_p$(sum) (e.g., sum of the bids for the best-effort group). In order to reserve a specific fraction of resources, a customer may submit a bid whose value is the same fraction of b(sum), where $b_f$(sum) be the bid that O2 submits (the unknown) in which this bid satisfies the following fraction so that $R_f$ resources can be reserved: $b_f(sum)/(b_f(sum)+b_p(sum))=R_f/R$, and solving for $b_f$(sum) in the equation above yields: $b_f(sum)=(R_f*b_p(sum))/(R−R_f)$.

Distributed Reservations

To prevent any complication of reservations that can stem from distributing resource allocation decisions among multiple auction servers complicate reservations, each auction server may be set to broadcast an additional scalar value without incurring an additional network roundtrip. Recall that for distributed auctions among k auction servers $A_1, \ldots, A_k$, where each auction server $A_i$ computes the sum of local bid values $b_1$(sum) and broadcasts this to all other auction servers. In turn, each server $A_i$ computes the global sum over all bids and determines the amount of resources $R_i$ that it can allocate to customers.

With reservations, an auction server may be assigned customers needing a minimum fraction of resources in which their bids are initially unknown. Let $R_{fi}$ denote the amount of resources reserved by customers assigned to auction server $A_i$, and let $b_{pi}$(sum) denote the sum of bids from customers who have not reserved resources and may need best effort scheduling. Thus, $A_i$ may broadcast the following local vector to all other auction servers: $<R_{fi}, b_{pi}(sum)>$. Once the local vectors are collected, each auction server may compute the global sum of bids from all its corresponding customers that have reserved resources as follows: $b_f(sum)=((R_{f1}+ \ldots +R_{fk})*(b_{p1}(sum)+ \ldots +b_{pk}(sum)))/(R−(R_{f1}+ \ldots +R_{fk}))$, $R_{f1}+ \ldots +R_{fk}$ denotes the total amount of reserved resources, and $b_{p1}(sum)+ \ldots +b_{pk}(sum)$ denotes the sum of bids from all best effort customers. Using this information, each auction server $A_i$ can then compute the bid amount for each of its customers that have reserved resources. Recall that in the provisioning section, it was mentioned that the amount of resources allocated to a customer may be directly proportional to their bid. Assuming that customer Oi reserved r(i) resources, then the bid amount is computed as: $b(i)=r(i)*(b_p(sum)+b_f(sum))/R$.

As aforementioned, in one embodiment, each auction server may be individually equipped to employ any number and combination of components of resource mechanism 110 to perform the various processes discussed throughout this document. In another embodiment, a server computing device may employ resource mechanism 110 to perform all of the processes or in some cases most of the processes while selectively delegating the rest of the processes to various auction servers in communication with the server computing device.

To make the example concrete, let us consider a high contention scenario in which two auction servers arrive at a globally optimal decision and let customers O1, O2, O3 submit the following bidding vectors: <O1, 700, 300, 300, 1>, <O2, 200, 42, 42, 35%>, and <O3, 100, 12, 12, 1>. For example and in one embodiment, the bidding process may be scaled across two auction servers in which $A_1$ is responsible for O1 and O2 whereas $A_2$ is responsible for O3. The bid values for O2 and O3 may be unknown and subsequently computed in a distributed fashion. Here, each auction server may first compute and broadcast the following local vectors (where the amount of resources reserved $R_{fi}$ followed by the sum of local bids $b_{pi}$ (sum)): A1: <35, 70> and A2: <12, 0>. Next, each auction server computes the sum of bids from all customers that have reserved resources (e.g. O2 and O3): $b_f(sum)=((R_{f1}+R_{f2})*(b_{p1}(sum)+b_{p2}(sum)))/(R−R_{f1}−R_{f2})= ((35+12)*(70+0))/(100−35−12)=62$. Finally and subsequently, server $A_1$ computes the bid that O2 can submit to reserve 35% of available resources: $b(2)=r(2)*(b_p(sum)+b_f(sum))/R=35*(70+62)/100=46.2$. Similarly, $A_2$ computes the bid for O3 as 15.8. These bids match the values that would have been decided by decision logic 236 at a single auction server.

Funding Policy and Throttling

In one embodiment, auction-based resource sharing logic 232 further provides a technique to facilitate decision making, via decision logic 236, to address 1) a way for customers to receive fund on credits and purchase resources on an ongoing basis, and 2) balancing between rewarding "well-behaved" customers for submitting requests infrequently and penalizing customers that flood the queue on a continuous basis.

Credit Funding Frequency and Amount

In one embodiment, decision logic 236 may be used to address and determine how customer credits are replenished and subsequently, enforcement module 246 may be used to enforce the credit decision achieved by decision logic 236. How customer credits are replenished may involve various components, such as 1) source, 2) amount, and 3) frequency. For example, the source component deals with how credits originate, where a natural option is to implement an open market-based system whereby credits can be incrementally funded by customers through external sources, such as adding money to their account. This allows us to map credits directly to the operational cost of processing messages and charge customers accordingly based on usage. An open system also providers customers greater control over message processing in which they can add funds when they anticipate a large number of low-latency messages. However, to lower accounting complexities and costs, an alternative and approach includes a closed system in which credits are funded internally on a continuous basis. Although embodiments support both the closed and open credit/accounting systems as well as any other available credit/accounting systems, but for brevity and ease of understanding, closed system is assumed and discussed for the rest of the discussion.

The amount component may include the initial amount of credits to supply each customer, where the amount of credits can be sufficiently large such that customers are unlikely to deplete these credits within a day. Further, a fraction of overall credits may be considered such that they are allocated to each customer, where let fe(i) denotes the expected and fair fraction of resources that can be allocated to customer Oi relative to other customers and this fraction can be computed by calculation module 240 in several ways, such as by the number of subscribers (revenue), the size of customer data (usage), etc. Both subscribers and data size are good approximations of fairness, where let $C_i$ be the initial amount of credits given to customer Oi and $C_{sum}$ denote the sum of credits given to all customers. As such, the following equation may be used by decision logic 236 and can hold to ensure that the resources are allocated correctly: $fe(i)=C_i/C_{sum}$.

Additionally, the frequency component is considered where credits are replenished to ensure that customers can bid for resources on an ongoing basis and allow the provisioning algorithm to adjust allocation decisions as our definition of fairness change over time. The rate at which customer credits are replenished may be made proportional to the amount of resources available; for example, let the unit of resource allocation be, for example, one second of execution time per thread and 30 MQ threads may be expected to be available for the next period of time, such as five minutes.

Continuing with the example, 1800 credits (30*60 units of resources) may be distributed, for example, every minute to customers for five minutes. Of the 1800 credits distributed, the amount that a customer Oi receives may be proportional to fe(i), such as if the technology disclosed herein can expect a fair allocation of Oi is fe(i)=0.3, then Oi receives 540 additional credits every minute. Replenishing of credits may also be triggered when resources are available but a customer may not execute its messages due to the lack of credits. Consider an extreme example in which all messages on the queue belong to a single customer and the customer has already depleted its share of credits; in this case, a proportional distribution of credits is triggered to all customers so that resources do not remain idle.

Further, decision logic 236 may intelligently tweak the distribution of credits over time to maintain fairness in allocation of thread resources. For example, consider a customer that has terminated their subscription or a customer that gradually increases their subscription over time. For a variety of reasons, resource allocation decisions may change and any excess credits can be redistributed among the remaining customers. To tweak the distribution of credits, in one embodiment, a fairness fraction fe(i) may be used for each customer either manually or automatically (e.g., redistribution of credits of a terminated customer to one or more remaining customers in a proportional manner, etc.). For brevity and ease of understanding, throughout the rest of the document, any new credits may be distributed to customer Oi may be proportional to the updated fe(i) and over time, the distribution of credits among customers may reflect the fraction of resources fe(i) that can be expect to allocate to each customer Oi.

Balancing Heavy and Infrequent Users

Regarding balancing between heavy users that continually flood the queue with messages and "well-behaved" customers that submit messages infrequently, the customers that continuously submit long running messages that consume a large fraction of available resources may deplete their credits at a faster rate. This, in one embodiment, may penalize the customer as the fraction of allocated resources decreases with their depleted credits and those customers may not have sufficient credits to schedule long-running messages. Conversely, in one embodiment, customers that submit messages infrequently may be rewarded for conserving MQ resources. These customers may accumulate a large reserve of credits such that when they do submit messages, they may receive a larger fraction of the resources as dictated by the provisioning algorithm.

To balance the aforementioned penalties and rewards for these two groups of customers, calculation module 240 of decision logic 236 may employ a cap and borrow funding policy such that customers that deplete credits at a rapid rate may be able to borrow credits to schedule messages if excess capacity is available. For borrowing to occur, two conditions may have to be satisfied: 1) determination that there are unused resources following the bidding process; and 2) certain customers may not have sufficient credits to schedule their pending messages. When this occurs, decision logic 236 may initiate an additional round of credit distributions to some or all customers (as described in Credit Funding section of this document) such that more messages can be scheduled and that the available resources do not remain idle. This ensures that customers that continually flood the queue are penalized (e.g., lack the credits to run their messages) when contention for MQ resources is high, but if MQ resources are abundant, heavy users are allowed to borrow additional credits to run their messages and take advantage of the additional system capacity.

To reward customers for conserving MQ resources and submitting messages infrequently, in one embodiment, decision logic 236 allows them to accumulate any unused credits and, in the process, increasing the fraction of resources allocated (e.g., priority) when they do run. However, if the customer remains inactive for weeks at a time, they can accumulate a large reserve of credits that when they do submit messages, they dominate the bidding process and starve other customers. For example and in one embodiment, calculation module 240 may consider and propose a cap that bounds the maximum amount of resources that any one customer can accumulate; for example, any unused credits expire 24 hours after they are funded. This technique rewards infrequent customers without unfairly penalizing other customers that stay within their budgeted amount of credits. It is to be noted that the aforementioned cap and borrow schemes do not require manual intervention or processes and that embodiments provide for the cap and borrow schemes to be performed automatically by auction-based resource sharing logic 232 in that customer workloads are adapted in a manner that penalizes customers if they deplete their credits too rapidly.

Bid Frequency

Workload access patterns evolve rapidly over time such that resource allocation decisions cannot remain static and adapt accordingly. Consider the prior example in which customers O1, O2, and O3 complete a round of bidding and a fourth customer O4 immediately floods the queue with its messages. The resource allocation decision can be updated to reflect O4's messages by reducing resources allocated to O1, O2, and O3 and assigning them to O4. Further, updates may be triggered periodically (e.g., on arrival of 1000 new messages or every minute) to ensure that the overhead of running the resource-provisioning algorithm is amortized over multiple messages and remains low and a fair allocation of resources may be achieved even at a low granularity level.

Orphaned Resources: Over-Allocation and Under-Allocation

In one embodiment, auction-based resource sharing logic 232 provides a technique to avoid or prevent any over-allocation and under-allocation of resources to customers to a fair allocation of resources may be maintained. For example, recall that a customer's bid may be calculated by calculation module 240 as $b(i)=\min\{M(Oi), C_i*R/C_{sum}\}$ and by reserving the exact fraction of resources (e.g., reserving at 10%) that customer O1 needs to process its 10 messages, it is guaranteed to pay no more than the standard rate because the new bid is guaranteed to be lower as in turn, O1 grabs exactly what it needs while the remaining 90 units of resources are allocated to O2. In other words, by rewriting O1's bid as an SLA reservation prevents over allocation of resources.

In contrast, to avoid under allocation of resources, orphaned resources may be pooled together and randomization may be employed to select the customer messages are executed. For example, the resources may be pooled and a random process may be employed to select the customer message that is executed, where pooling resources allows customers with fewer credits or long-running messages can run messages that they cannot afford alone and orphaned resources are utilized maximally. Further, using this technique and given these as inputs, function ProvisionOrphanedResources may allocate resources to customers as follow: ProvisionOrphanedResources (Customers (O1-On), Probabilities (p(1)-p(n)), Ro), where Ro>0 and existMessage (Customers, Ro), select C from Customers at random (Oi is selected with probability p(i)), M=getNextMessage(C), if(Cost(M)<Ro), Ro=Ro−Cost(M), and allocate(C)=allocate (C)+cost(M). Using this technique, when the next customer is picked, each customer Oi has probability p(i) of being selected (e.g., C selection above), where the next message for the customer is evaluated (e.g., getNextMessage) and if the message utilizes fewer than Ro resources, then resources may be deducted from Ro and allocated to the customer.

Estimating Message Cost

In one embodiment, calculation module 240 estimates message cost with accuracy to assist evaluation and capability module 242 to ensure accurate resource allocation decisions as enforced by enforcement module 246 and processed by job execution engine 248. For example, for MQ, this may mean being able to quickly determine expected runtime for each message type and customer combination by, for example and in one embodiment, relying on the existing approach of building a runtime history for each message type and customer combination. Then, estimate messages of the same type may be calculated based on prior runs. In another embodiment, apply machine learning may be applied to estimate the runtime-using metadata that describes a message type and the current system state. A machine-learning scheme may use training data from prior runs, which can be extracted from database 280. However, once calculation module 240 has experienced enough messages, it can estimate new message types with reasonable accuracy by comparing them to messages of a similar type.

Features that are useful for machine learning can be broadly categorized into system-related features and message-specific features. Message-specific features may include: whether the message CPU is heavy, the message utilizes database 280, resource constrained filters defined for message, and where was the message generated, what is the size of the customer, etc. For system state, good candidates may include a number of failed/retried handlers, total messages in queue, enqueue and dequeue rates, number of competing customers, number of database connections held, resource like CPU, disk, network, database 280) utilization, number of queue processors and slave threads in cluster, and traffic lights triggered by MQ monitoring threads, etc.

Furthermore, machine learning may also be used to determine which messages to run next based on resource thresholds that are set for application servers and database CPU. For example, calculation module 240 along with evaluation and capability 242, using information extracted by currency reserve 244 from database 280, may estimate the CPU utilization of a message given the current system state. Further, customers may be allowed to prevent messages from overwhelming CPU resources, prevent MQ alerts from being triggered due to high resource utilization, and move message throttling logic, such as bucketing of messages by CPU usage and scheduling messages in a round robin fashion to machine learning, which is easier to maintain.

Message-Based Queuing Policies

Multi-tenancy may require that each customer have their own virtual queue that can be managed separately from other customers. For instance, a customer can be able to customize message priorities within their own queue. In one embodiment, to prevent any potential problems related to such a requirement, virtual queues may be employed and, using auction-based resource sharing logic 232, the virtual queues may be provided on a per-customer and per-message type basis. For example, each customer receives a set of virtual queues (e.g., one per message type) that they can then manage. Moreover, global and POD-wide queuing policies may be employed. For instance, rate-limiting policies may be employed to prevent long-running messages type from occupying a large fraction of MQ threads and starving subsequent messages.

In one embodiment, additional user-based control may be afforded to customers so they are able to view the state of the queue along with the number of pending messages and the estimated wait times. Further, customers may be allowed to adjust message priorities to speed-up or throttle specific message types and thus best-effort allocation is facilitated by giving user-increased customer visibility and control over the MQ.

Priority by Message Type

In order to maintain priority by message type, in one embodiment, counter 250 may be employed as part of decision logic 236 to track the number of messages in the queue for each customer per message type. For example, counter 250 may be used to increment and/or decrement during enqueue and dequeue for each customer and message type combination. Moreover, customers may also be afforded customized message priorities such that two customers can have different rankings for the relative importance of different message types. Consider the following queue states for customers O1 and O2 in which credits/messages denotes the amount of resources required per message. Each customer may provide a priority preference that defines a priority for each message type; for example, high-priority messages may be processed prior to low-priority messages of a lower priority.

In one embodiment, decision logic 236 may choose which messages to run for each customers using two-level scheduling based on how much resources a customer utilizes at a coarse level. For example, at a fine level, the queue state and customers' priority preferences are into account to determine, for each customer, which message type and how many of each type to run next. This is accomplished by iterating, via counter 250, through the customer's messages in decreasing priority order and scheduling additional messages as long as resources have not been exhausted. If a message type requires more resources than allocated, then the counter 250 skips to the next message type that can be scheduled within the allotted amount of resources. Moreover, a high number of low-priority messages are scheduled using their resource allotment, while high-priority messages may be bypassed to ensures that customer resources are utilized in a maximum manner and do not remain idle. Note that if two message types have the same priority, in one embodiment, one of the two messages may be selected in a round robin fashion.

Global Policies

Similarly, in some embodiments, global rate limiting polices may be adopted to restrict the number and types of messages, such as CPU-heavy messages be blocked if an application/auction server CPU utilization exceeds, for example, 65%. For example, there may be two policy categories including 1) blocking or permitting messages of a certain type based on changes in system load, and 2) pre-determined concurrency limits that restricts the number of messages of a given type. The former policy decision may be distributed to each auction server to be applied independently, whereas the latter may be taken into consideration and decided at runtime when messages are dequeued. In one embodiment, the existing dequeue logic may be facilitated by auction-based resource sharing logic 232 to enforce global, message-type based concurrency limits.

Scalability of Queues for the New Transport

In some embodiments, resource mechanism 110 supports organizing org-based queues on the new transport (e.g., one queue per organization), message/cluster-based queues (e.g., one queue per message type or a database node combination), org/message-based queues (e.g., one queue per org/message type combination), etc. A cluster or node combination refers to a consolidation of multiple databases ("database node" or simply "nodes"), such as Real Application Clusters (RAC®) by Oracle®. A RAC may provide a database technology for scaling databases, where a RAC node may include a database computing host that processes database queries from various worker hosts. For example and in one embodiment, counter 250 may count or calculation module 240 may measure the number of non-empty queues that the new transport would need to support in production. Further, the number of queues with greater than 10 messages may be measured to facilitate coalescing queues with a few messages into a single physical queues and provisioning a new physical queue in the new transport if there are sufficient messages to justify the overhead. Additionally, overhead of org-based queues may be reduced by allowing certain orgs (with few messages) to share the same physical queue and, in one embodiment, queues may be split if one organization grows too large or coalesces other organizations with fewer messages.

The example of illustrating the use of technology disclosed herein should not be taken as limiting or preferred. This example sufficiently illustrates the technology disclosed without being overly complicated. It is not intended to illustrate all of the technologies disclose.

A person having ordinary skill in the art will appreciate that there are many potential applications for one or more implementations of this disclosure and hence, the implementations disclosed herein are not intended to limit this disclosure in any fashion.

Figure 3:
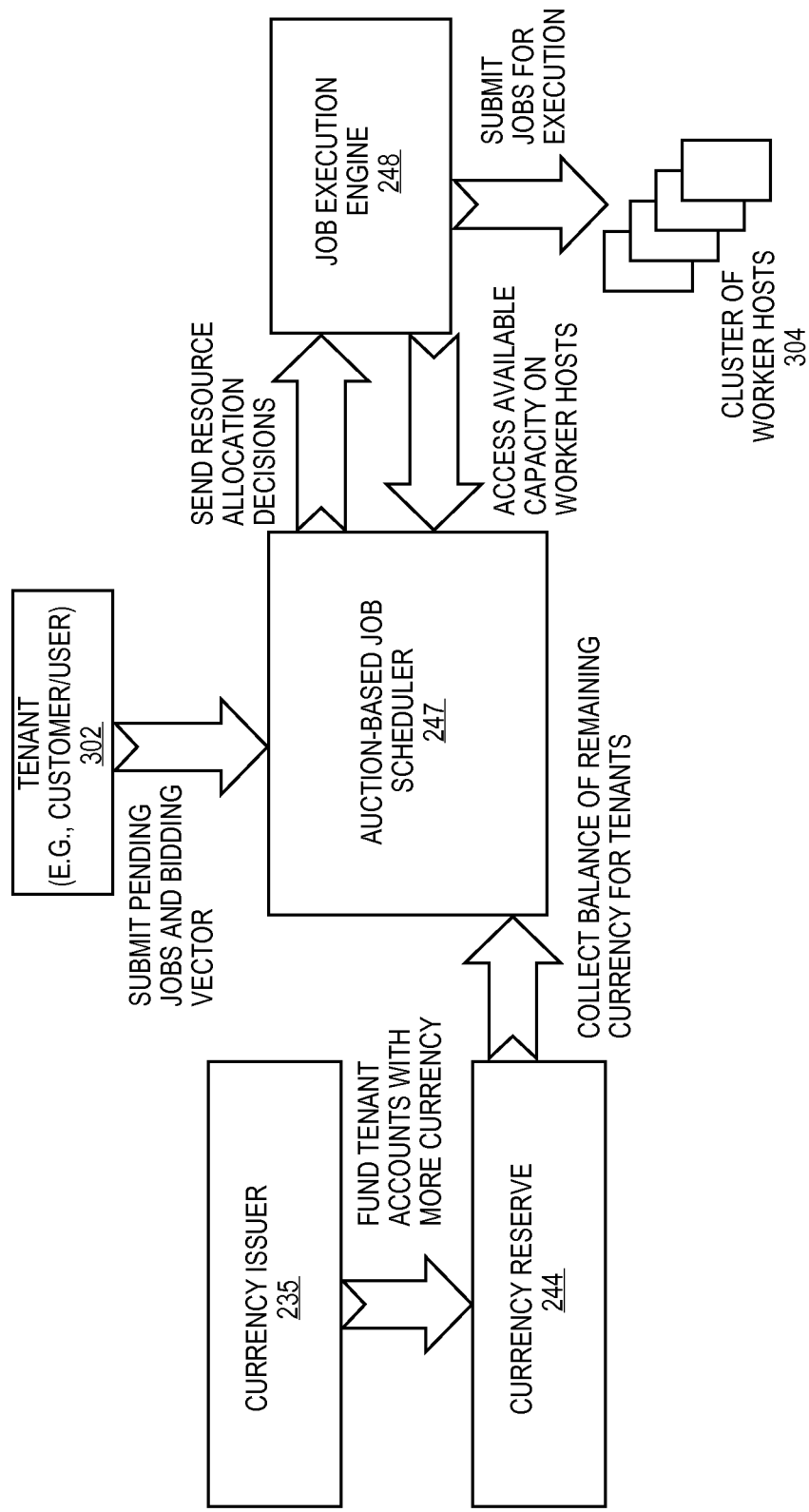
FIG. 3 illustrates an architecture for facilitating an auction-based fair allocation of thread resources for message queues as provided by the thread resource management mechanism of FIG. 1 according to one embodiment.

FIG. 3 illustrates an architecture 300 for facilitating an auction-based fair allocation of thread resources for message queues as provided by thread resource management mechanism 110 of FIG. 1 according to one embodiment. It is to be noted that for brevity and ease of understanding, most of the processes and components described with reference to FIG. 2 are not repeated here in FIG. 3 or with reference to any of the subsequent figures. In the illustrated embodiment, tenant 302 (e.g., a customer, such as user associated with the customer), via a client computing device, submits pending messages/jobs and bidding vectors via a user interface at a client computing device over a network, such as user interface 294 of client computing device 290 over network 285 of FIG. 2. As described extensively with reference to FIG. 2, the submitted user jobs and bidding vectors are processed by various components of auction-based resource sharing logic 232 of FIG. 2 before it is provided to be handled by auction-based job scheduler 247 of the illustrated embodiment.

In one embodiment, currency issuer 235 may provide issue or fund additional resource currency for tenant 302 in currency reserve 244 based on the processing performed by various components of auction-based resource sharing logic 232 as described with reference to FIG. 2. The resource currency balance for tenant 302 is collected or gathered and provided to scheduler 247 for its appropriate application. These resource allocation decisions are forwarded on to job execution engine 248 which then submits the user-requested jobs for execution at one or more works hosts 304 (e.g., servers or computing devices). Further, as illustrated, job execution engine 248 may stay in communication with scheduler 247 to access the available resource capacity on worker hosts 304.

Figure 4A:
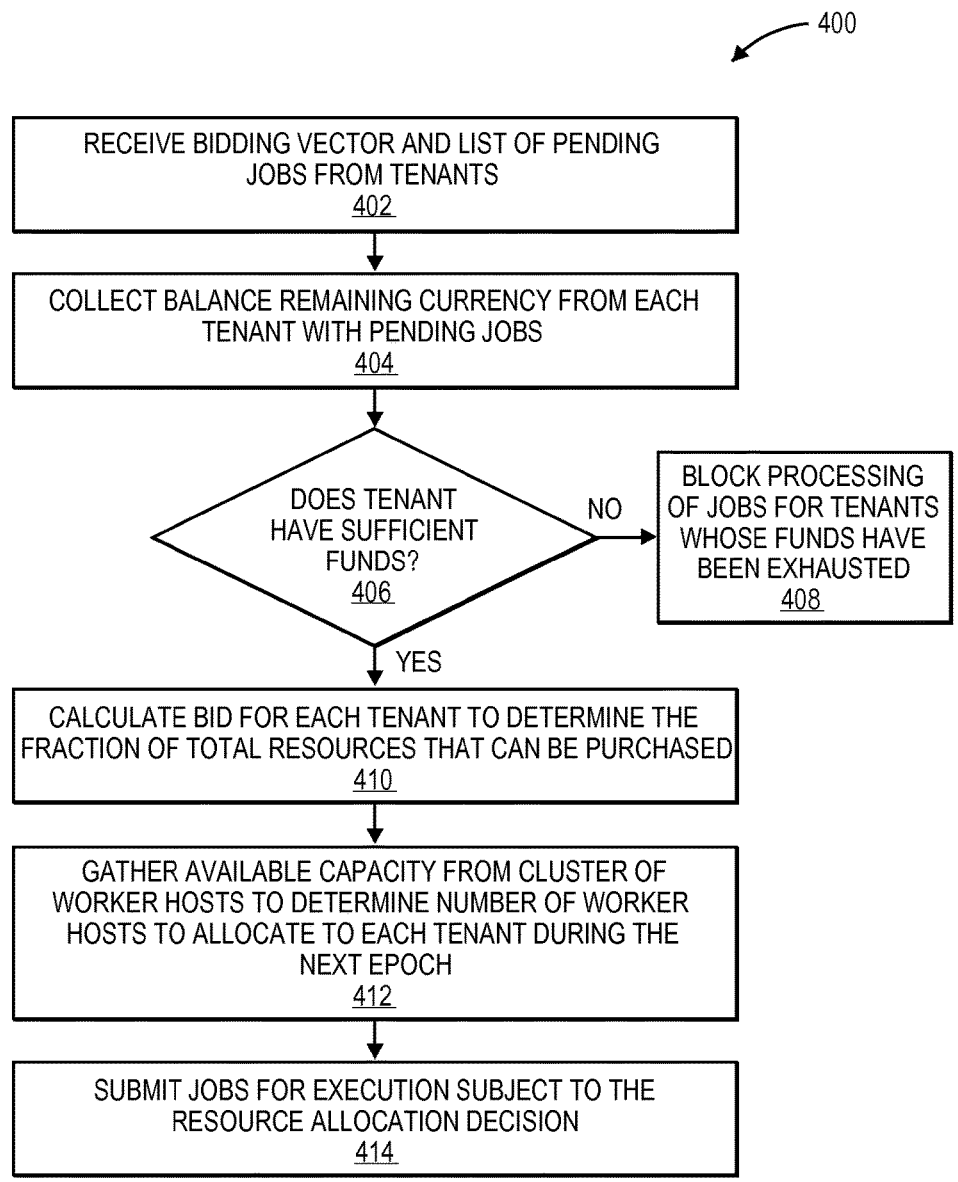
FIG. 4A illustrates a method for facilitating an auction-based fair allocation and usage of thread resources for user messages according to one embodiment.

FIG. 4A illustrates a method 400 for facilitating an auction-based fair allocation and usage of thread resources for user messages according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed by thread resource management mechanism 110 of FIG. 1.

Method 400 relates to and describes an auction-based job scheduler transaction involving auction-based job scheduler 247 of FIG. 2. Method 400 begins at block 402 with receiving bidding vectors and pending jobs from tenants (e.g., customers). At block 404, a balance of remaining currency is collected from each tenant with pending jobs. At block 406, a determination is made as to whether a particular tenant has sufficient funds. If not, for those tenants not having sufficient funds, the processing of their jobs is blocked at block 408. If yes, at block 410, a bid is calculated for each tenant to determine the fraction of total resources that can be purchased. At block 412, the available capacity from the cluster of worker hosts is gathered to determine the number of worker hosts to allocate to each tenant during the next epoch. An epoch refers to a time period or a time interval. Further, an epoch may be determined by how frequently an auction is conducted or run or re-run and in that case, the epoch may refer to the time between two consecutive auctions. For example, an epoch may be predefined and set to 10 minutes so that each time upon reaching the 10-minute mark, there is an opportunity to re-run the auction to evaluate how the resources are to be allocated to different customers. An epoch may be also determined by the purchase power of each tenant, such as using the available funds or remaining credits of various tenants, an epoch may be allocated for execution of certain jobs. At block 414, the requested jobs are submitted for execution based on the resource allocation decision as set forth by auction-based resource sharing logic 232 of FIG. 2.

Figure 4B:
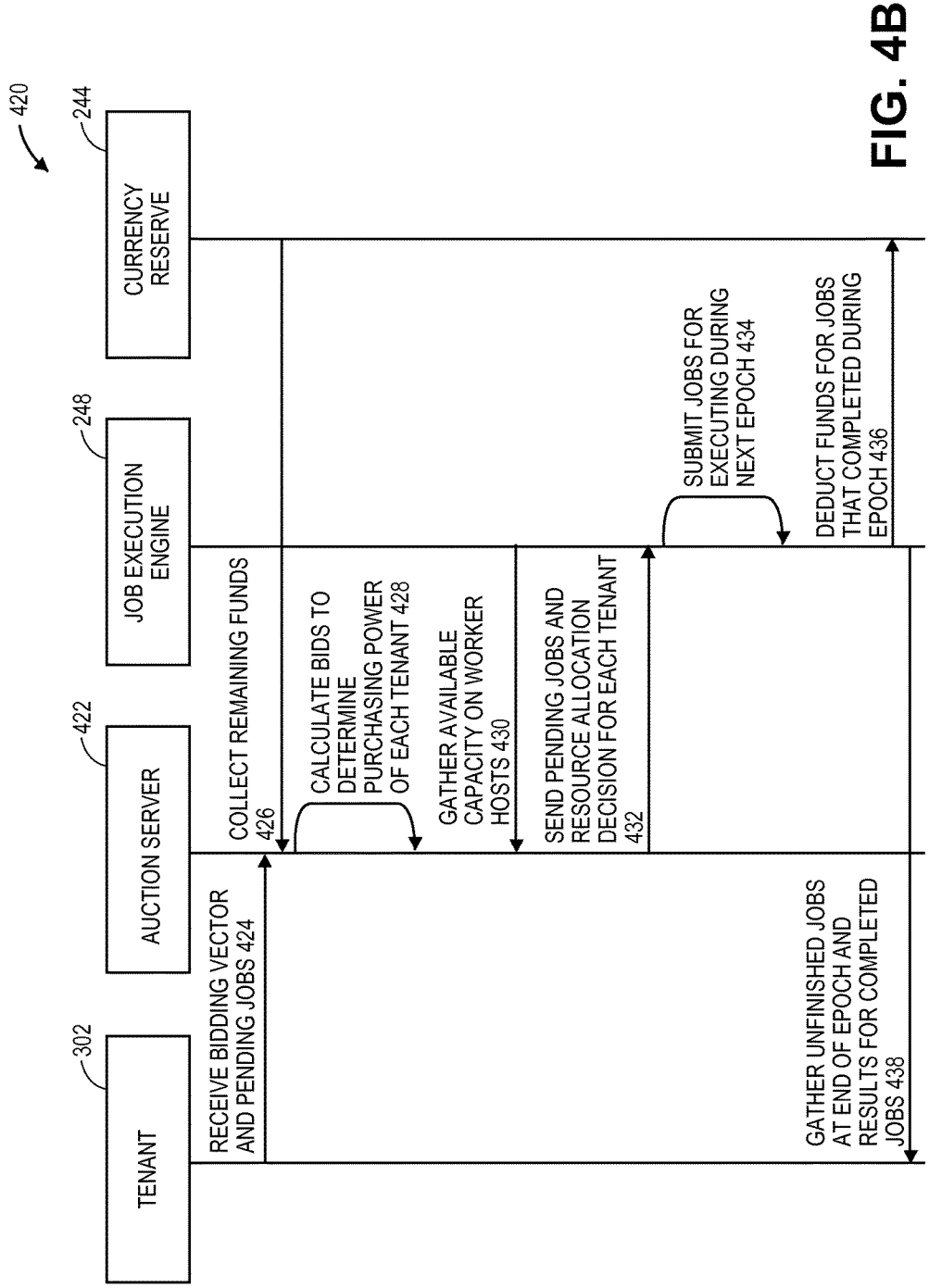
FIGS. 4B-4C illustrate transaction sequences for facilitating an auction-based fair allocation and usage of thread resources for user messages according to one embodiment.

FIG. 4B illustrates a transaction sequence 420 for facilitating an auction-based fair allocation and usage of thread resources for user messages according to one embodiment. Transaction sequence 420 may be performed by processing logic that may comprise hardware (e.g., circuitry, dedicated logic, programmable logic, etc.), software (such as instructions run on a processing device), or a combination thereof. In one embodiment, transaction sequence 420 may be performed by thread resource management mechanism 110 of FIG. 1.

Transaction sequence 420 relates to and describes an auction-based job scheduler transaction involving auction-based job scheduler 247 of FIG. 2. In one embodiment, auction server 422 receives bidding vectors and pending jobs 424 from tenant 302. On the other hand, the remaining resource currency funds are collected 426 at auction server 422 from currency server 244. Then, bids are calculated to determine purchasing power of each tenant 428 at auction server 422, while any available capacity relating to worker hosts is received 430 at auction server 422 from job execution engine 248.

In one embodiment, any pending jobs and the resource allocation decision relating to each tenant are sent 432 from auction server 422 to job execution engine 248. Further, at job execution engine 248, the pending jobs are submitted for execution during next epoch 434. At currency reserve 244, any funds relating to the jobs that completed during epoch are deducted 434, whereas any unfinished jobs at the end of epoch and results from the completed jobs are gathered 438 and communicated from job execution engine 248 to tenant 302.

Figure 4C:
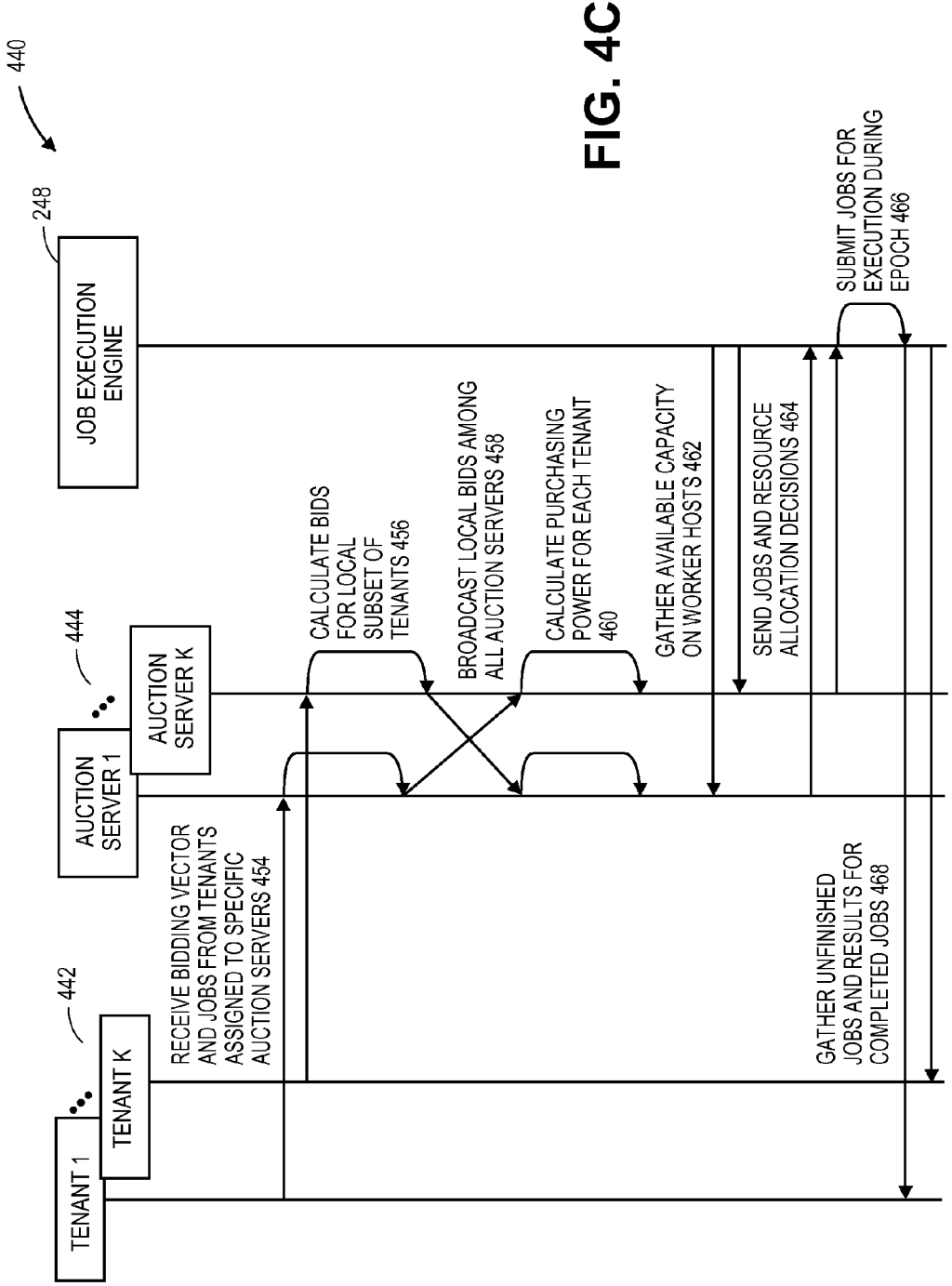

FIG. 4C illustrates a transaction sequence 440 for facilitating an auction-based fair allocation and usage of thread resources for user messages according to one embodiment. Transaction sequence 440 may be performed by processing logic that may comprise hardware (e.g., circuitry, dedicated logic, programmable logic, etc.), software (such as instructions run on a processing device), or a combination thereof. In one embodiment, transaction sequence 440 may be performed by thread resource management mechanism 110 of FIG. 1.

Transaction sequence 440 relates to and describes an auction-based job scheduler transaction with distributed bidding involving auction-based job scheduler 247 of FIG. 2. In the illustrated embodiment, multiple auction servers 444 receive bidding vectors and jobs 454 from their corresponding multiple tenants (e.g., customers) 442. At each of the multiple auction servers 444, bids are calculated for local subsets of tenants 456. The local bids are then broadcast between all auction servers 458 and then, purchasing power for each tenant is calculated 460 at auction servers 444. The available capacity on worker nodes is gathered 462 and communicated from job execution engine 248 to the multiple auction servers 444, whereas jobs and resource allocation decisions are sent 464 from auction servers 444 to job execution engine 248. At job execution engine 248, jobs are submitted for execution during epoch 466, whereas unfinished jobs and results for the completed jobs are gathered 468 and communicated from job execution engine 248 to multiple tenants 442.

Figure 5:
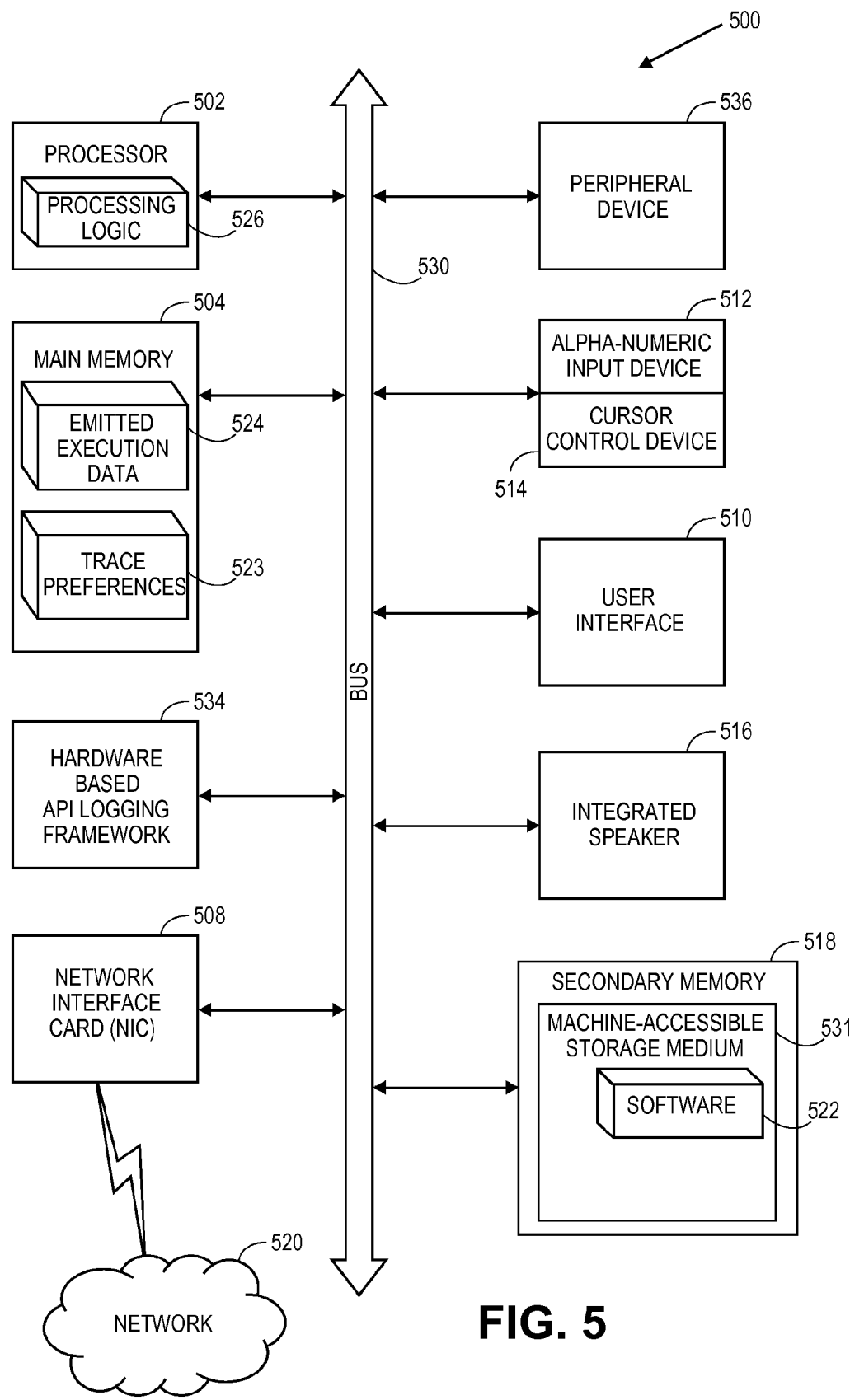
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing device 100 and computing device 290 of FIG. 1 and FIG. 2, respectively. In alternative embodiments, the machine may be connected (e.g., networked) to other machines in a network (such as host machine 100 of FIG. 1 connected with client machine 290 over network 285 of FIG. 2), such as a cloud-based network, a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of thread resource management mechanism 110 as described with reference to FIG. 1 and other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of thread resource management mechanism 110 as described with reference to FIG. 1 and other figures described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
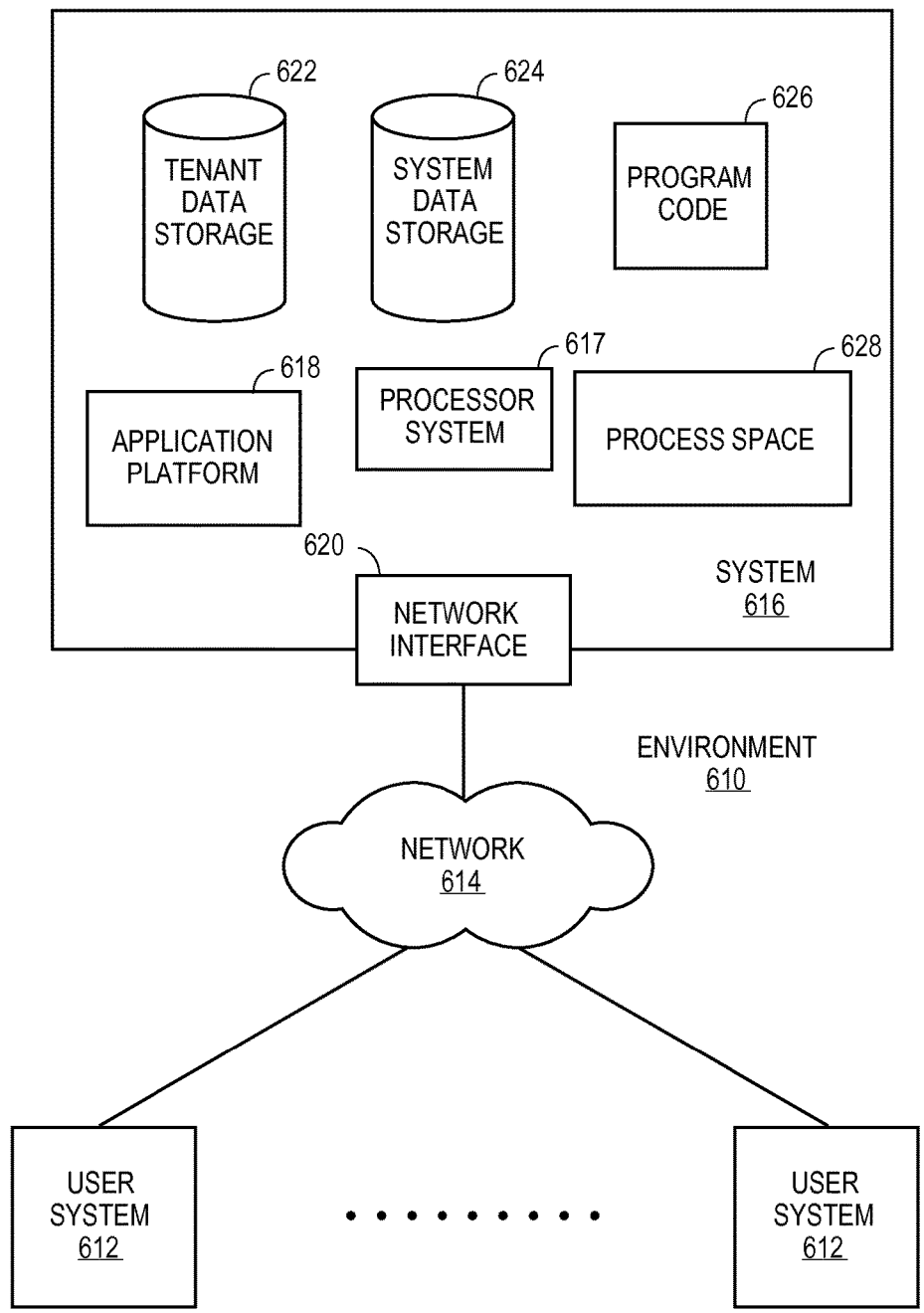
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, mobile device, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processors or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
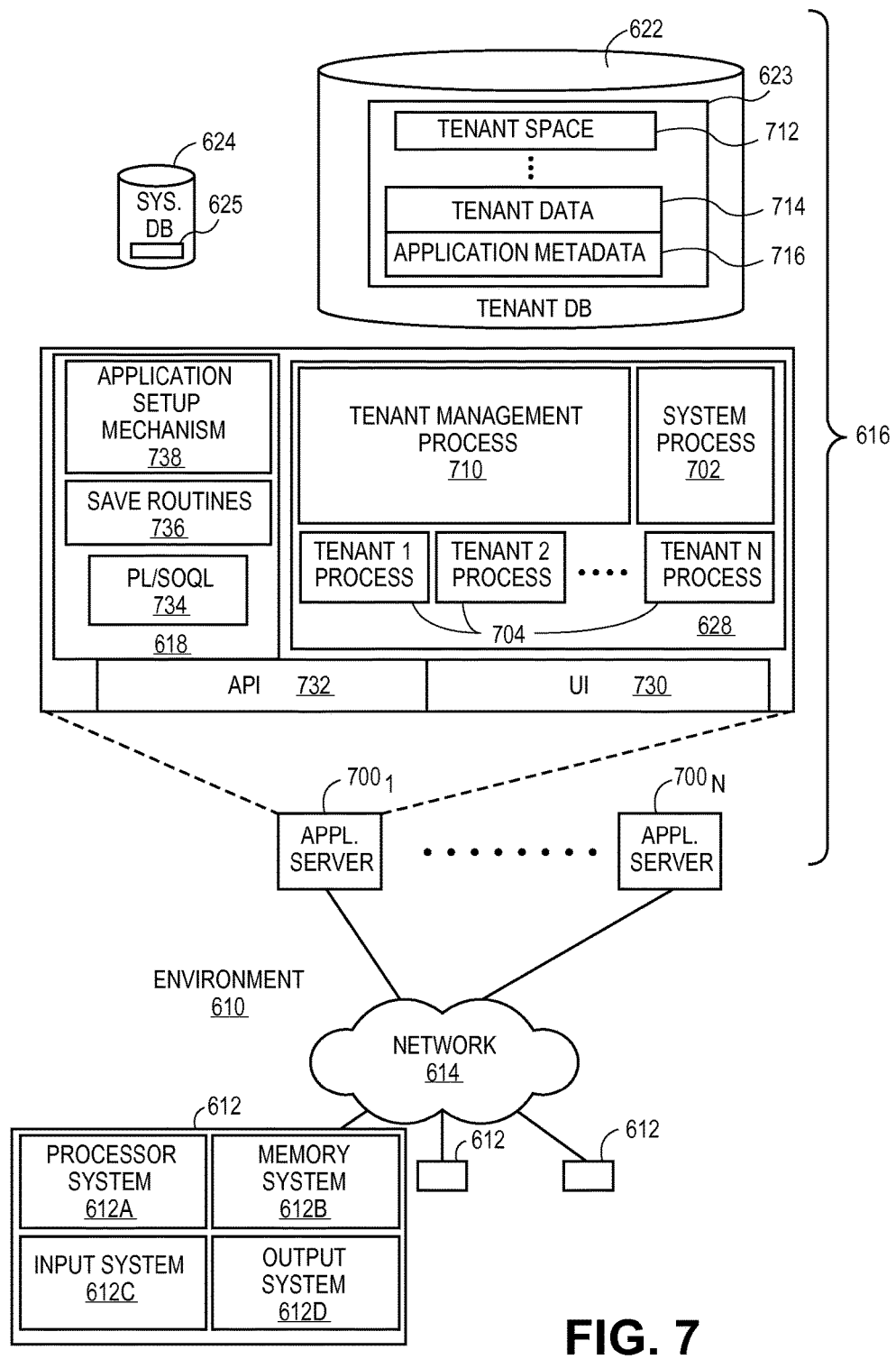
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A database system-implemented method for auction-based resource sharing between tenants in a multi-tenant database environment having an auction server computing device ("auction device") having one or more processing devices and associated memory devices hosting a thread resource management to facilitate the one or more processing devices to perform the method comprising:

receiving, by the auction device, bids from the tenants in the multi-tenant database environment for resources for at least one of new jobs and pending jobs, wherein the thread resource management mechanism comprises a processing framework including auction-based resource sharing logic to facilitate the auction-based resource sharing between the tenants;

facilitating, by the auction device, a two-level scheduling scheme to perform resource allocation decisions on the bids, wherein the two-level scheduling scheme considers priorities associated with the tenants and message types of the new jobs and pending jobs, wherein considering priorities includes reviewing one or more historical considerations for the tenants and the message types, wherein the historical considerations include at least one of frequency at which one or more tenants are known for requesting one or more jobs, and runtime history indicating expected runtime for processing of one or more message types;

based on the two-level scheduling scheme, determining, by the auction device, whether a first tenant possesses sufficient currency to win a bid for allocation of a first portion of the resources for at least one of a first new job and a first pending job, wherein the determining further includes evaluating whether a second pending job of a second tenant has been completed without consuming a second portion of the resources dedicated to the second tenant for completion of the second pending job; and allocating, by the auction device, the first portion of the resources to the first tenant in response to the bid by the first tenant, wherein the first portion includes at least one of a new set of resources and unused dedicated resources of the second tenant, wherein allocating is based, from the considered priorities, on one or more priorities associated with the first tenant and a message type of the first new job or the first pending job.

2. The method of claim 1, wherein allocating further includes associating a third portion of the resources with a third tenant to perform a subsequent new job request or a third pending job corresponding to another message type in response to a bid placed by the third tenant, if an actual resource usage by the third tenant is less than an expected resource usage of the third tenant.

3. The method of claim 1, further comprising allowing, by the auction device, the first tenant and the third tenant to purchase the first portion and the third portion, respectively, of the resources based on one or more of job size or bid superiority, wherein the bid superiority is based on monetary values associated with the bids.

4. The method of claim 1, further comprising broadcasting, by the auction device, the bids to the tenants that the broadcasted bids to facilitate additional bids from the tenants.

5. The method of claim 1, wherein the bids are received by the auction device over a communication network comprising one or more of a cloud-based network, a Local Area Network (LAN), a Wide Area Network (WAN), a Metropolitan Area Network (MAN), a Personal Area Network (PAN), an intranet, an extranet, and the Internet.

6. A database system having an auction server computing device ("auction device") to facilitate auction-based resource sharing between tenants in a multi-tenant database environment, the auction device having one or more processing devices and associated memory devices hosting a thread resource management to facilitate the one or more processing devices to perform operations comprising:

receiving bids from the tenants in the multi-tenant database environment for resources for at least one of new jobs and pending jobs, wherein the thread resource management mechanism comprises a processing framework including auction-based resource sharing logic to facilitate the auction-based resource sharing between the tenants;

facilitating a two-level scheduling scheme to perform resource allocation decisions on the bids, wherein the two-level scheduling scheme considers priorities associated with the tenants and message types of the new jobs and pending jobs, wherein considering priorities includes reviewing one or more historical considerations for the tenants and the message types, wherein the historical considerations include at least one of frequency at which one or more tenants are known for requesting one or more jobs, and runtime history indicating expected runtime for processing of one or more message types;

based on the two-level scheduling scheme, determining whether a first tenant possesses sufficient currency to win a bid for allocation of a first portion of the resources for at least one of a first new job and a first pending job, wherein the determining further includes evaluating whether a second pending job of a second tenant has been completed without consuming a second portion of the resources dedicated to the second tenant for completion of the second pending job; and allocating the first portion of the resources to the first tenant in response to the bid by the first tenant, wherein the first portion includes at least one of a new set of resources and unused dedicated resources of the second tenant, wherein allocating is based, from the considered priorities, on one or more priorities associated with the first tenant and a message type of the first new job or the first pending job.

7. The database system of claim 6, wherein allocating further includes associating a third portion of the resources with a third tenant to perform a subsequent new job request or a third pending job corresponding to another message type in response to a bid placed by the third tenant, if an actual resource usage by the third tenant is less than an expected resource usage of the third tenant.

8. The database system of claim 6, wherein the operations further comprise allowing the first tenant and the third tenant to purchase the first portion and the third portion, respectively, of the resources based on one or more of job size or bid superiority, wherein the bid superiority is based on monetary values associated with the bids.

9. The database system of claim 6, wherein the operations further comprise broadcasting the bids to the tenants that the broadcasted bids to facilitate additional bids from the tenants.

10. The database system of claim 6, wherein the bids are received by the auction device over a communication network comprising one or more of a cloud-based network, a Local Area Network (LAN), a Wide Area Network (WAN), a Metropolitan Area Network (MAN), a Personal Area Network (PAN), an intranet, an extranet, and the Internet.

11. A non-transitory machine-readable medium having stored thereon instructions which, when executed by a processing device of an auction server computing device in a multi-tenant database environment, cause the processing device to perform operations comprising:

receiving bids from tenants in the multi-tenant database environment for resources for at least one of new jobs and pending jobs, the auction device to facilitate auction-based resource sharing between the tenants in the multi-tenant database environment, wherein the thread resource management mechanism comprises a processing framework including auction-based resource sharing logic to facilitate the auction-based resource sharing between the tenants;

facilitating a two-level scheduling scheme to perform resource allocation decisions on the bids, wherein the two-level scheduling scheme considers priorities associated with the tenants and message types of the new jobs and pending jobs, wherein considering priorities includes reviewing one or more historical considerations for the tenants and the message types, wherein the historical considerations include at least one of frequency at which one or more tenants are known for requesting one or more jobs, and runtime history indicating expected runtime for processing of one or more message types;

based on the two-level scheduling scheme, determining whether a first tenant possesses sufficient currency to win a bid for allocation of a first portion of the resources for at least one of a first new job and a first pending job, wherein the determining further includes evaluating whether a second pending job of a second tenant has been completed without consuming a second portion of the resources dedicated to the second tenant for completion of the second pending job; and allocating the first portion of the resources to the first tenant in response to the bid by the first tenant, wherein the first portion includes at least one of a new set of resources and unused dedicated resources of the second tenant, wherein allocating is based, from the considered priorities, on one or more priorities associated with the first tenant and a message type of the first new job or the first pending job.

12. The non-transitory machine-readable medium of claim 11, wherein allocating further includes associating a third portion of the resources with a third tenant to perform a subsequent new job request or a third pending job corresponding to another message type in response to a bid placed by the third tenant, if an actual resource usage by the third tenant is less than an expected resource usage of the third tenant.

13. The non-transitory machine-readable medium of claim 11, wherein the operations further comprise allowing the first tenant and the third tenant to purchase the first portion and the third portion, respectively, of the resources based on one or more of job size or bid superiority, wherein the bid superiority is based on monetary values associated with the bids.

14. The non-transitory machine-readable medium of claim 11, wherein the operations further comprise broadcasting the bids to the tenants that the broadcasted bids to facilitate additional bids from the tenants.

15. The non-transitory machine-readable medium of claim 11, wherein the bids are received by the auction device over a communication network comprising one or more of a cloud-based network, a Local Area Network (LAN), a Wide Area Network (WAN), a Metropolitan Area Network (MAN), a Personal Area Network (PAN), an intranet, an extranet, and the Internet.

* * * * *